US012592205B2

(12) United States Patent
Furihata et al.

(10) Patent No.: US 12,592,205 B2
(45) Date of Patent: Mar. 31, 2026

(54) TUNING OF LOCAL DIMMING FUNCTION

(71) Applicant: Synaptics Incorporated, San Jose, CA (US)

(72) Inventors: Hirobumi Furihata, Tokyo (JP); Takashi Nose, Kanagawa (JP); Akio Sugiyama, Tokyo (JP); Atul Sharma, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/809,885

(22) Filed: Aug. 20, 2024

(65) Prior Publication Data

US 2025/0140213 A1 May 1, 2025

Related U.S. Application Data

(60) Provisional application No. 63/595,067, filed on Nov. 1, 2023.

(51) Int. Cl.
*G09G 3/34* (2006.01)

(52) U.S. Cl.
CPC ... *G09G 3/3426* (2013.01); *G09G 2320/0646* (2013.01); *G09G 2320/0693* (2013.01); *G09G 2360/16* (2013.01)

(58) Field of Classification Search
CPC .. G09G 3/006; G09G 3/34–3426; G09G 3/36; G09G 3/3607; G09G 2310/0237–024; G09G 2320/0233; G09G 2320/0271–0276; G09G 2320/0285; G09G 2320/0613–0653; G09G 2320/0686–0693; G09G 2360/14–16; G02F 1/1309; G02F 1/1336–133613
See application file for complete search history.

(56) References Cited

U.S. PATENT DOCUMENTS

2008/0259020 A1* 10/2008 Fisekovic .............. G09G 3/342 345/102
2010/0128051 A1* 5/2010 Mizuta ................. G09G 3/3426 345/589
2010/0207535 A1* 8/2010 Kim ..................... G09G 3/3426 315/210
2011/0122170 A1* 5/2011 Kim ..................... G09G 3/3406 345/102

(Continued)

*Primary Examiner* — Keith L Crawley
(74) *Attorney, Agent, or Firm* — Leydig, Voit & Mayer, Ltd.

(57) ABSTRACT

A method for tuning a local dimming function includes measuring a first luminance level of a measurement area of a display panel while the display panel is illuminated with four light sources of a backlight device, the four light sources being arranged in two rows and two columns. The method further includes measuring a second luminance level of the measurement area while the display panel is illuminated with two of the four light sources, the two of the four light sources being arranged in the same row or the same column. The method further includes measuring a third luminance level of the measurement area while the display panel is illuminated with one of the four light sources. The method further includes determining, based on the first, second, and third luminance levels of the measurement area, filter coefficients of a directivity filter used for a local dimming function.

20 Claims, 19 Drawing Sheets

(56) References Cited

U.S. PATENT DOCUMENTS

| | | | | |
|---|---|---|---|---|
| 2011/0141155 | A1* | 6/2011 | Hong | G09G 3/3426 356/256 |
| 2011/0279482 | A1* | 11/2011 | Neal | G09G 3/3426 315/291 |
| 2013/0265336 | A1* | 10/2013 | Kikkawa | G09G 3/3426 345/690 |
| 2019/0348001 | A1* | 11/2019 | Shi | G09G 3/32 |
| 2019/0353961 | A1* | 11/2019 | Ji | G09G 3/3426 |
| 2021/0304649 | A1* | 9/2021 | Orio | G09G 3/006 |
| 2024/0321225 | A1* | 9/2024 | Xue | G09G 3/3426 |

* cited by examiner

TUNING OF LOCAL DIMMING FUNCTION

CROSS-REFERENCE TO RELATED APPLICATIONS

This application claims benefit under 35 U.S.C. § 119(e) to U.S. Provisional Patent Application Ser. No. 63/595,067, filed on Nov. 1, 2023, which is incorporated herein by reference in its entirety.

TECHNICAL FIELD

This disclosure relates generally to panel display devices, and more particularly to tuning of a local dimming function implemented in panel display devices.

BACKGROUND

The local dimming function is one of the technologies for increasing the contrast of liquid crystal display (LCD) devices. The local dimming technology can realize high dynamic contrast and low power consumption by individually controlling respective light sources (e.g., light emitting diodes (LEDs)) of the backlight system according to input image data. In one implementation, the brightness level of each light source may be controlled based on the luminance of the part of the input image displayed in the zone of the LCD panel illuminated by that light source.

The image quality of an LCD device with the local dimming function may depend on the light directivity characteristics (or light distribution characteristics) of the light sources of the backlight system. In order to mitigate display artifacts such as halo, flicker, and brightness unevenness, the local dimming function is desired to be tuned based on the light directivity characteristics of the light sources.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a method. The method comprises measuring a first luminance level of a measurement area of a display panel while the display panel is illuminated with four light sources of a backlight device. The four light sources are arranged in two rows and two columns. The method further includes measuring a second luminance level of the measurement area while the display panel is illuminated with two of the four light sources. The two of the four light sources are arranged in the same row or the same column. The method further includes measuring a third luminance level of the measurement area while the display panel is illuminated with one of the four light sources. The method further includes determining, based on the first, second and third luminance levels of the measurement area, filter coefficients of a directivity filter used for a local dimming function implemented in a display device that includes the display panel.

In another exemplary embodiment, the present disclosure provides a calibration device includes a luminance measurement device and a processor. The luminance measurement device is configured to measure a first luminance level of a measurement area of a display panel while the display panel is illuminated with four light sources of a backlight device. The four light sources are arranged in two rows and two columns. The luminance measurement device is configured to measure a second luminance level of the measurement area while the display panel is illuminated with two of the four light sources. The two of the four light sources are arranged in the same row or the same column. The luminance measurement device is configured to measure a third luminance level of the measurement area while the display panel is illuminated with one of the four light sources. The processor is configured to calculate, based on the first, second, and third luminance levels of the measurement area, a set of parameters used to determine filter coefficients of a directivity filter used for a local dimming function implemented in a display device that includes the display panel.

In still another exemplary embodiment, the present disclosure provides a non-transitory tangible computer-readable storage medium. The non-transitory tangible computer-readable storage medium stores program code which when executed, cause a processor to acquire a first luminance level of a measurement area of a display panel, wherein the first luminance level of the measurement area is measured while the display panel is illuminated with four light sources of a backlight device. The four light sources are arranged in two rows and two columns. The program code further causes the processor to acquire a second luminance level of the measurement area, wherein the second luminance level of the measurement area is measured while the display panel is illuminated with two of the four light sources. The two of the four light sources being arranged in the same row or the same column. The program code further causes the processor to acquire a third luminance level of the measurement area, wherein the third luminance level of the measurement area is measured while the display panel is illuminated with one of the four light sources. The program code further causes the processor to calculate, based on the first, second, and third luminance levels of the measurement area, a set of parameters used to determine filter coefficients of a directivity filter used for a local dimming function implemented in a display device that includes the display panel.

Further features and aspects are described in additional detail below with reference to the attached drawings.

Figure 1:
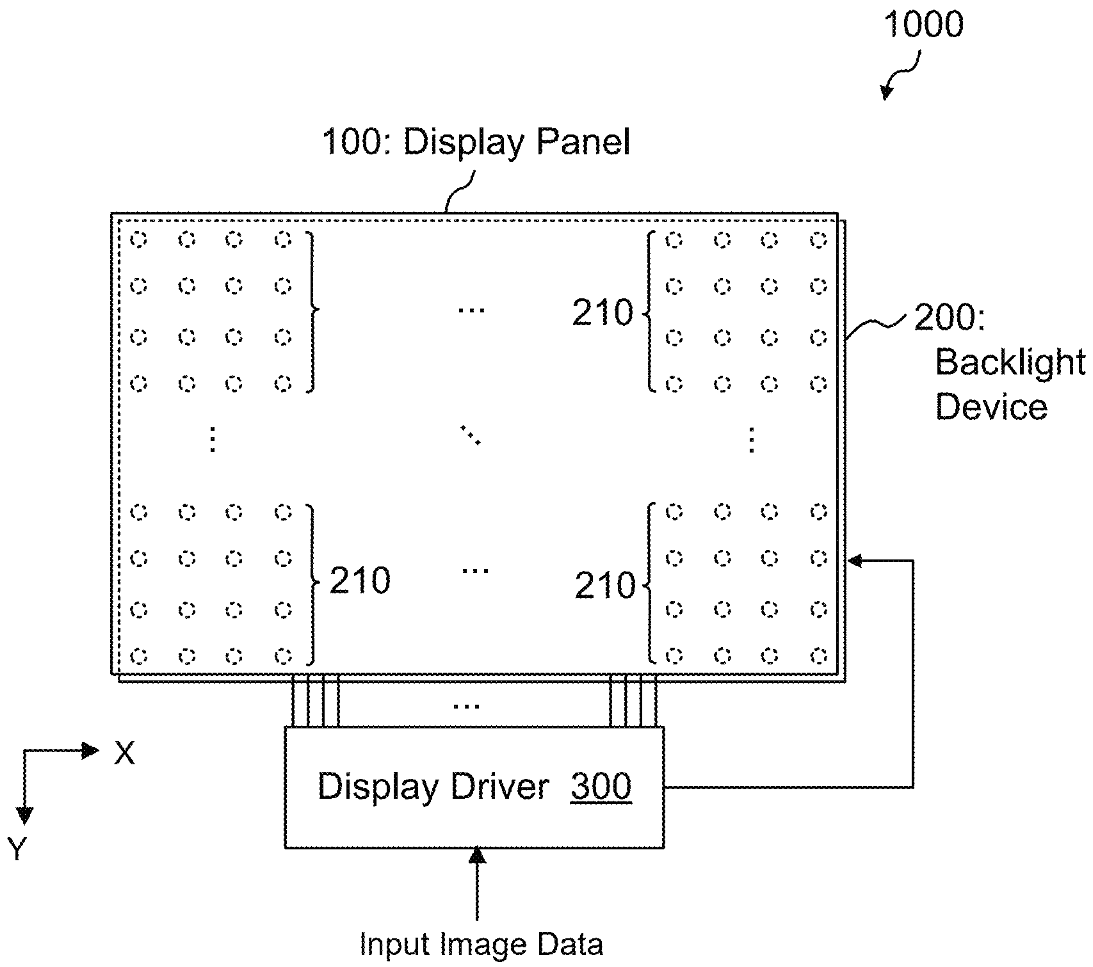
FIG. 1 shows an example configuration of a display device, according to one or more embodiments.

To facilitate understanding, identical reference numerals have been used, where possible, to designate elements that are common to the figures. It is contemplated that elements disclosed in one embodiment may be utilized in other embodiments without specific recitation. Suffixes may be appended to reference numerals to distinguish elements from each other. The drawings referenced herein are not be to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Furthermore, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The local dimming function, which can achieve high dynamic contrast and low power consumption by individually controlling respective light sources (e.g., light emitting diodes (LEDs)) of the backlight system, is one of the technologies for improving the image quality of liquid crystal display (LCD) devices. In one implementation, the brightness level of each light source may be controlled based on the brightness of the part of the input image displayed in the zone of the LCD panel illuminated by that light source.

The image quality of an LCD device with the local dimming function may depend on the light directivity characteristics (or light distribution characteristics) of the light sources of the backlight system. In order to mitigate display artifacts such as halo, flicker, and brightness unevenness, the local dimming function is tuned based on the light directivity characteristics of the light sources.

In some implementations, the local dimming function may use a directivity filter prepared based on the light directivity characteristics to determine the brightness levels of the respective light sources of the backlight system. The directivity filter may be applied to a part of the input image corresponding to each light source to generate a filtered image part, and the brightness level of each light source may be controlled based on the average picture level (APL) of the filtered image part. The use of the directivity filter enables the local dimming function to be performed based on the light directivity characteristics of the light sources. In order to improve the image quality, the directivity filter may be appropriately tuned. The present disclosure provides various technologies for efficiently tuning the directivity filter to achieve improved image quality with the local dimming function.

FIG. 1 shows an example configuration of a display device 1000, according to one or more embodiments. In the shown embodiment, the display device 1000 includes a display panel 100, a backlight device 200 and a display driver 300. The display panel 100 may be a light-transmissive display panel, such as an LCD panel. The backlight device 200 is configured to illuminate the display panel 100. The display driver 300 is configured to receive input image data and drive the display panel 100 based on the input image data. The input image data may correspond to an input image and include pixel data of the pixels of the input image. In one implementation, the pixel data of each pixel includes greylevels of respective primitive colors (e.g., red (R), green (G), and blue (B)). In one implementation, each pixel of the display panel 100 may include R, G, and B subpixels configured to display red, green, and blue colors, respectively, and the pixel data of each pixel of the input image may include R, G, and B greylevels that specify the luminance levels of the R, G, and B subpixels, respectively.

Figure 2:
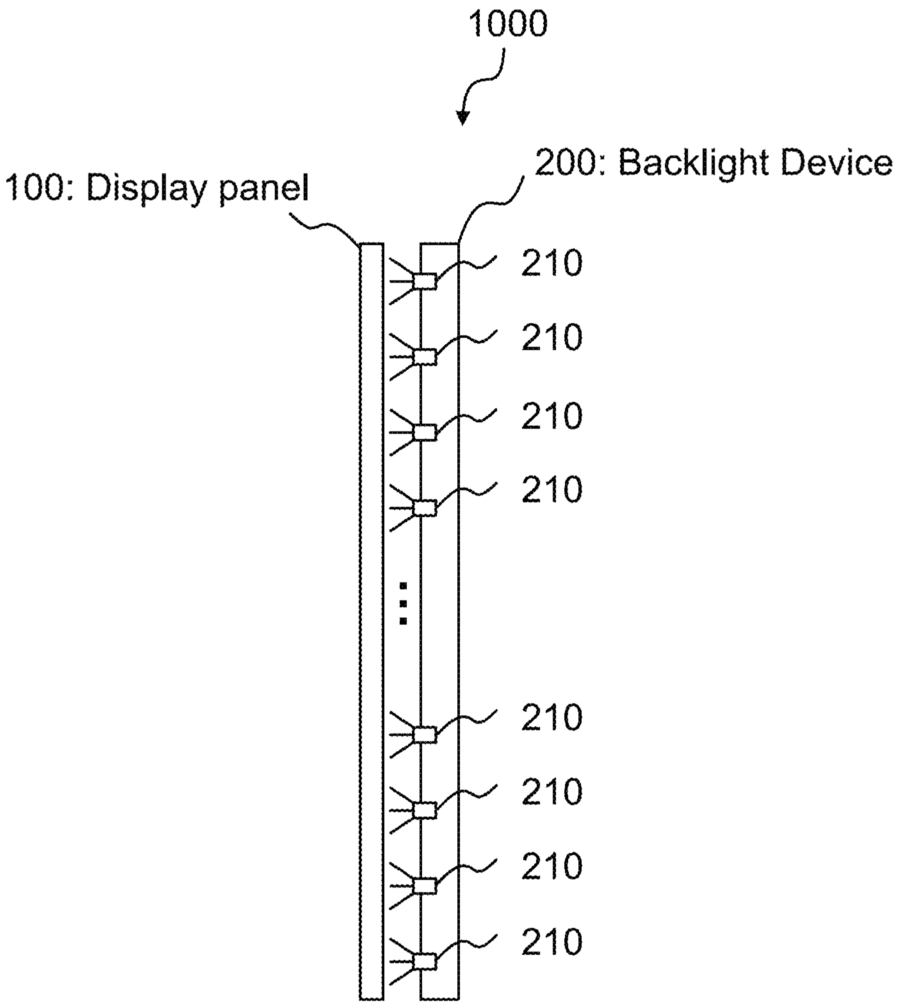
FIG. 2 shows an example side view configuration of the display device shown in FIG. 1, according to one or more embodiments.

The backlight device 200 includes an array of light sources 210. It should be noted that the light sources 210 are shown in phantom in FIG. 1 because the light sources 210 are located behind the display panel 200 as shown in FIG. 2, which shows a side view configuration of the display device 1000. While 64 light sources 210 are shown in FIG. 1, those skilled in the art would appreciate that the backlight device 200 may include more or less than 64 light sources 210. In actual implementations, the backlight device 200 may include several hundred to several thousand light sources 210. In one implementation, each light source 210 may include one or more light emitting diodes (LEDs) or different types of light sources.

Figure 3:
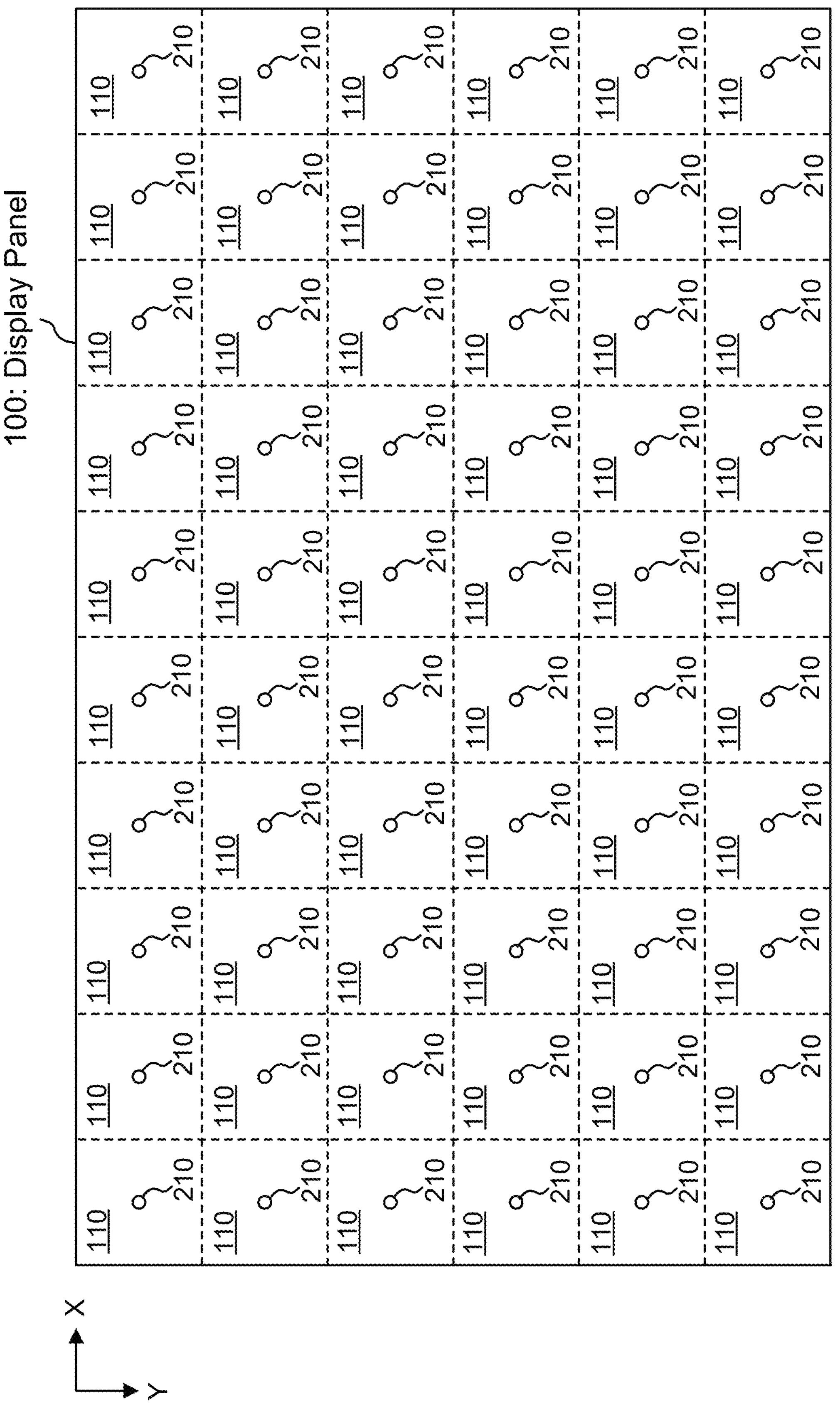
FIG. 3 shows an example arrangement of light sources of a backlight device, according to one or more embodiments.

FIG. 3 shows an example arrangement of the light sources 210 of the backlight device 200, according to one or more embodiments. A plurality of zones 110 arranged in rows and columns are defined for the display panel 100, and the light sources 210 are located behind the corresponding zones 110. In the shown embodiment, the zones 110 have a rectangular shape, e.g., a square shape. In other embodiments, the zones 110 may have a different plane-filling figure, such as a hexagonal shape and a rhombic shape. Each light source 210 is located such that the projection of each light source 210 onto the display panel 100 is positioned at the center (e.g., the geometric center) of the corresponding one of the zones 110. As used herein, the "corresponding zone" 110 of a light source 210 refers to the zone 110 that includes the projection of that light source 210 onto the display panel 100. It should be noted that due to the light distribution characteristics of the light sources 210, each light source 210 primarily illuminates the corresponding zone 110, but may secondarily illuminate at least portions of the zones 110 around (e.g., adjacent to) the corresponding zone 110.

The display device 1000 is adapted to perform a local dimming function that controls the luminance levels of the light sources 210 based on the input image data. In one or more embodiments, the local dimming function may be performed on a "zone" basis. More specifically, the luminance level of each light source 210 may be controlled based on input image data for the zone 110 corresponding to that light source 210. In some implementations, the luminance level of each light source 210 may be controlled based on input image data for the corresponding zone 110 of that light source 210 and also input image data for at least portions of the zones 110 around (e.g., adjacent to) the corresponding zone 110.

Figure 4:
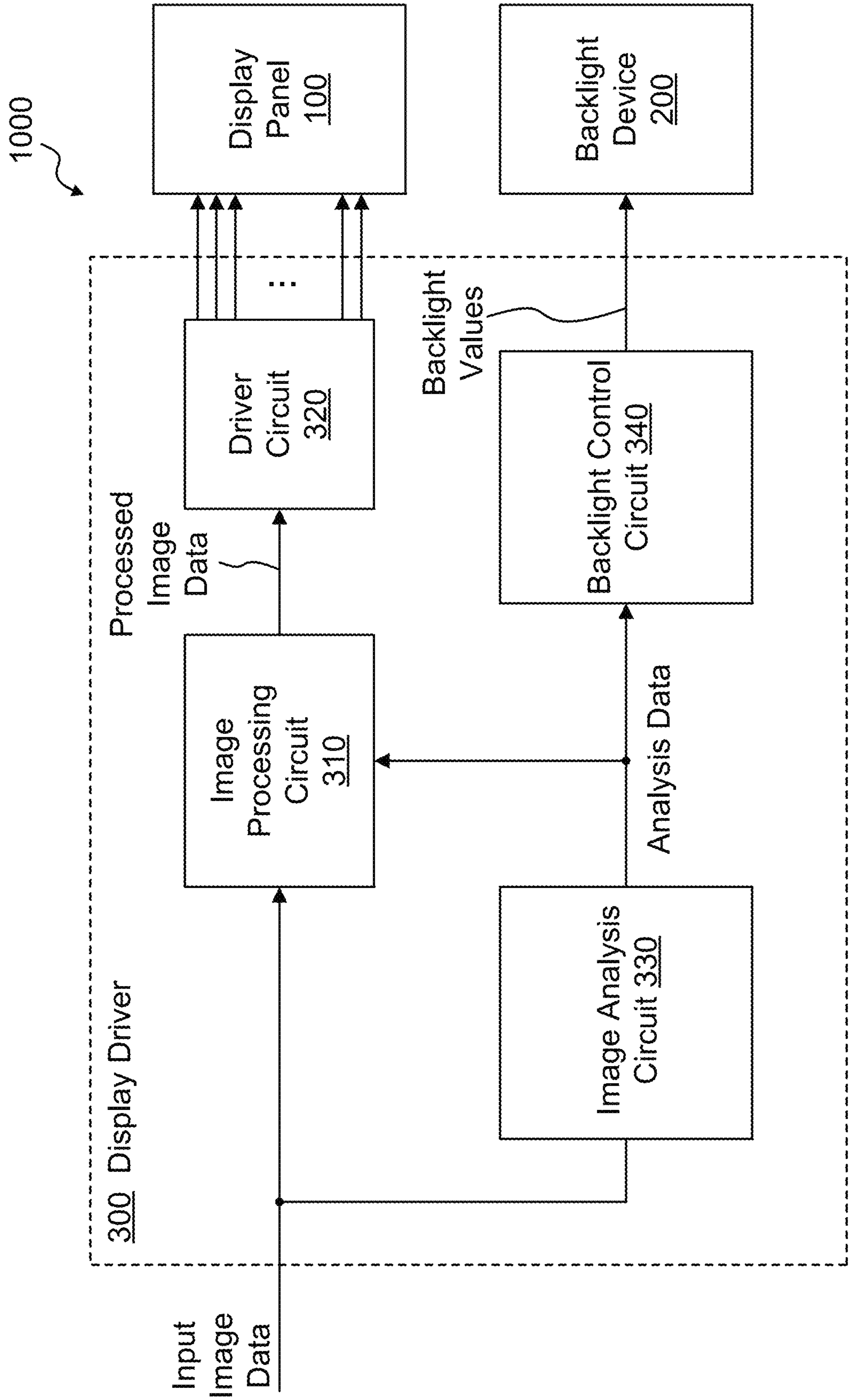
FIG. 4 shows an example configuration of a display driver, according to one or more embodiments.

FIG. 4 shows an example configuration of the display driver 300, according to one or more embodiments. In the shown embodiment, the display driver 300 includes an image processing circuit 310, a driver circuit 320, an image analysis circuit 330, and a backlight control circuit 340. The image processing circuit 310 is configured to perform image processing on the input image data to generate processed image data. The image processing performed by the image processing circuit 310 may include color adjustment, demura correction, deburn correction, image scaling, gamma transformation, or other image processing. The driver circuit 320 is configured to receive the processed image data from the image processing circuit 310 and to drive respective pixels of the display panel 100 based at least in part on the processed image data. The image analysis circuit 330 is configured to analyze the input image data to generate analysis data. The analysis data may include information indicative of the brightness of the input image around each light source 210. Details of the generation of the analysis data will be described later. The analysis data is provided to the backlight control circuit 340. The backlight control circuit 340 is configured to implement the local dimming function based on the analysis data. More specifically, the backlight control circuit 340 is configured to generate backlight values for the respective light source 210 based on the analysis data to individually control the light source 210. The backlight value for a light source 210 may indicate the brightness level to which the light source 210 is to be controlled. The analysis data may further be provided to the image processing circuit 310. In such implementations, the image processing circuit 310 may process the input image data based on the analysis data.

Figure 5:
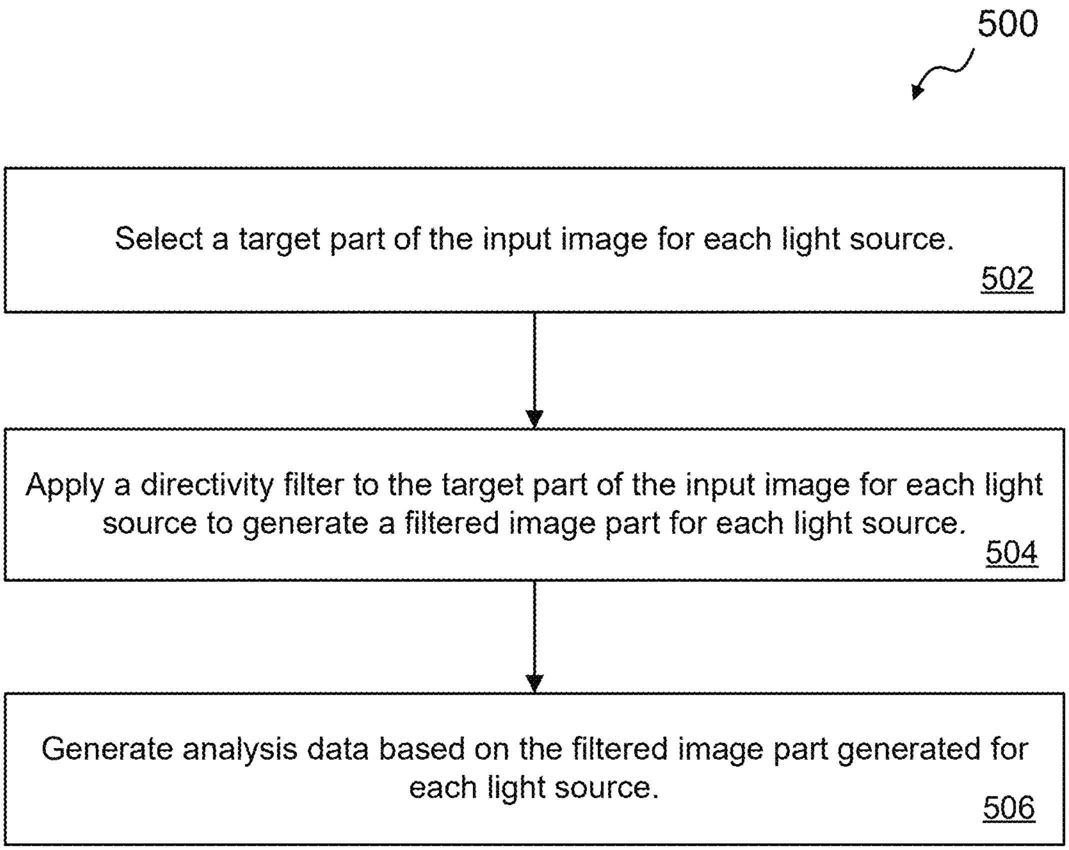
FIG. 5 is a flowchart showing an example process for generating analysis data, according to one or more embodiments.

FIG. 5 is a flowchart showing an example process 500 for generating the analysis data, according to one or more embodiments. In one implementation, the process 500 is implemented by the image analysis circuit 330. It will be appreciated that any of the following steps may be performed in any suitable order.

Figure 6:
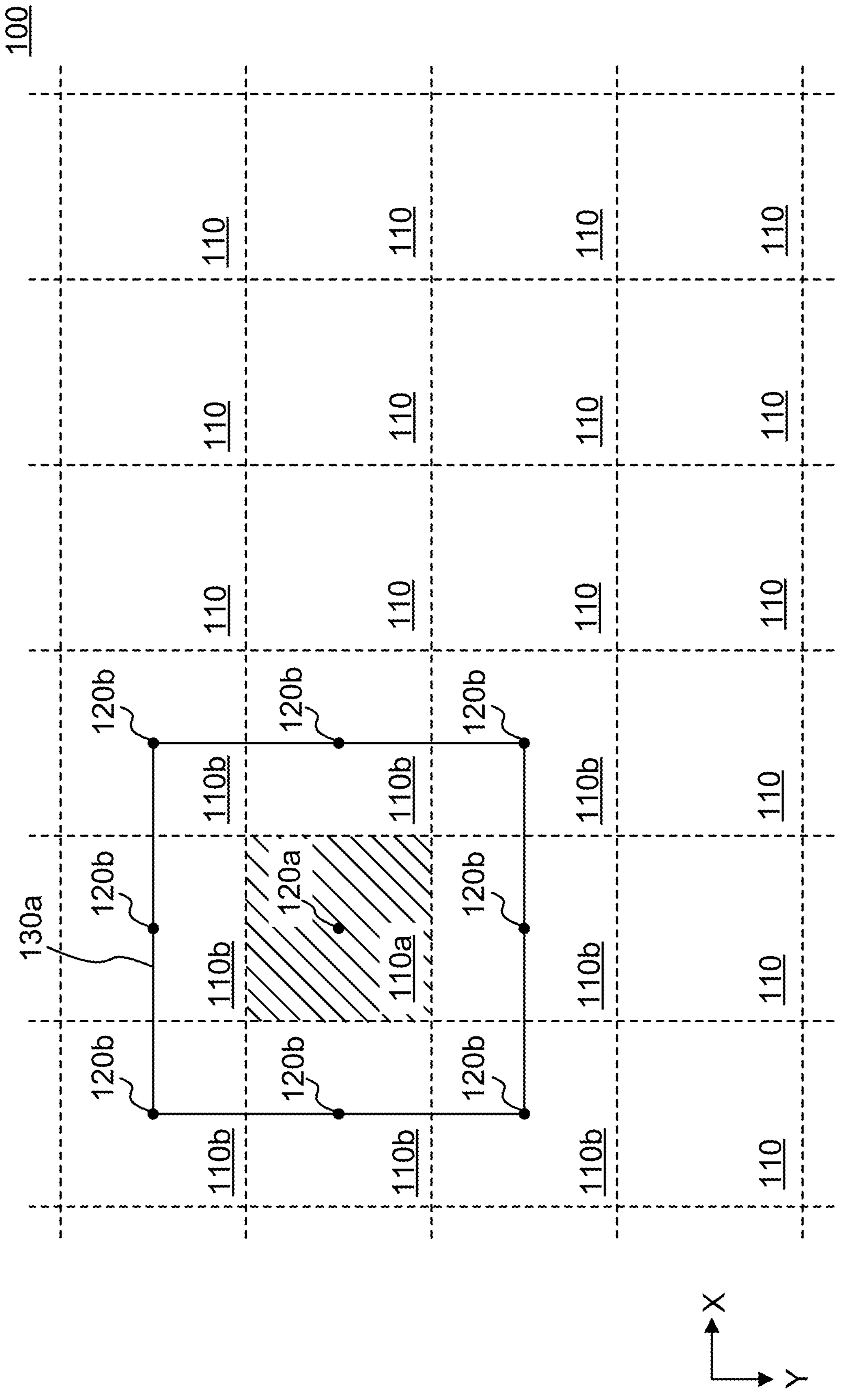
FIG. 6 shows an example selection of a target part of an input image for a light source of interest, according to one or more embodiments.

In step 502, the image analysis circuit 330 selects a target part of the input image for each light source 210. FIG. 6 shows an example selection of a target part of the input image for a light source 210 of interest, according to one or more embodiments. In FIG. 6, the numeral "110*a*" denotes the zone 110 corresponding to the light source 210 of interest, and the numerals "110*b*" denote the eight zones 110 adjacent to the zone 110*a*. The zone 110*a* corresponding to the light source 210 of interest is indicated by hatching in FIG. 6. Further, the numeral "120*a*" denotes the projection of the light source 210 of interest onto the display panel 100, i.e., the centers (e.g., the geometric centers) of the zone 110*a*, and the numeral "120*b*" denotes the projections of the light sources 210 surrounding the light source 210 of interest onto the display panel 100, i.e., the centers (e.g., the geometric centers) of the zones 110*b* surrounding the zone 110*a*.

In one or more embodiments, the target part of the input image for the light source 210 of interest is selected such that the target part is displayed in a corresponding region 130*a* of the display panel 100, wherein the corresponding region 130*a* is a substantially rectangular (e.g., square) region having a boundary that passes through the centers of the eight zones 110*b* surrounding the zone 110*a* corresponding to the light source 210 of interest. The centers of four of the eight surrounding zones 110*b* are at the four corners of the corresponding region 130*a* and the centers of the other four adjacent zones 110*b* are on the four edges of the corresponding region 130*a*. The target parts of the input image for other light sources 210 may be selected in a similar manner. The target part for each light source 210 may be selected differently, as long as the region of the display panel 100 in which the target part selected for each light source 210 is displayed incorporates at least the zone 110 corresponding to that light source 210. It should be noted that target parts of the input image selected for adjacent light sources 210 may overlap. In the example shown in FIG. 6, the height and width of each target part are both twice the height and width of a zone 110, and the target part selected for the light source 210 corresponding to the zone 110*a* partially overlaps with target parts selected for the light sources 210 corresponding to the zones 110*b*.

Referring back to FIG. 5, in step 504, the image analysis circuit 330 applies a directivity filter to the target part of the input image selected for each light source 210 to generate a filtered image part for each light source 210. In one or more embodiments, the directivity filter includes filter coefficients defined for the respective pixels of the target part of the input image, and the filtered image part is generated by applying the filter coefficients to pixel data of the respective pixels of the target part. In one implementation, the pixel data of the respective pixels of the filtered image part may be generated by multiplying the pixel data of the corresponding pixels of the target part by the filter coefficients defined for the corresponding pixels of the target part.

Figure 7:
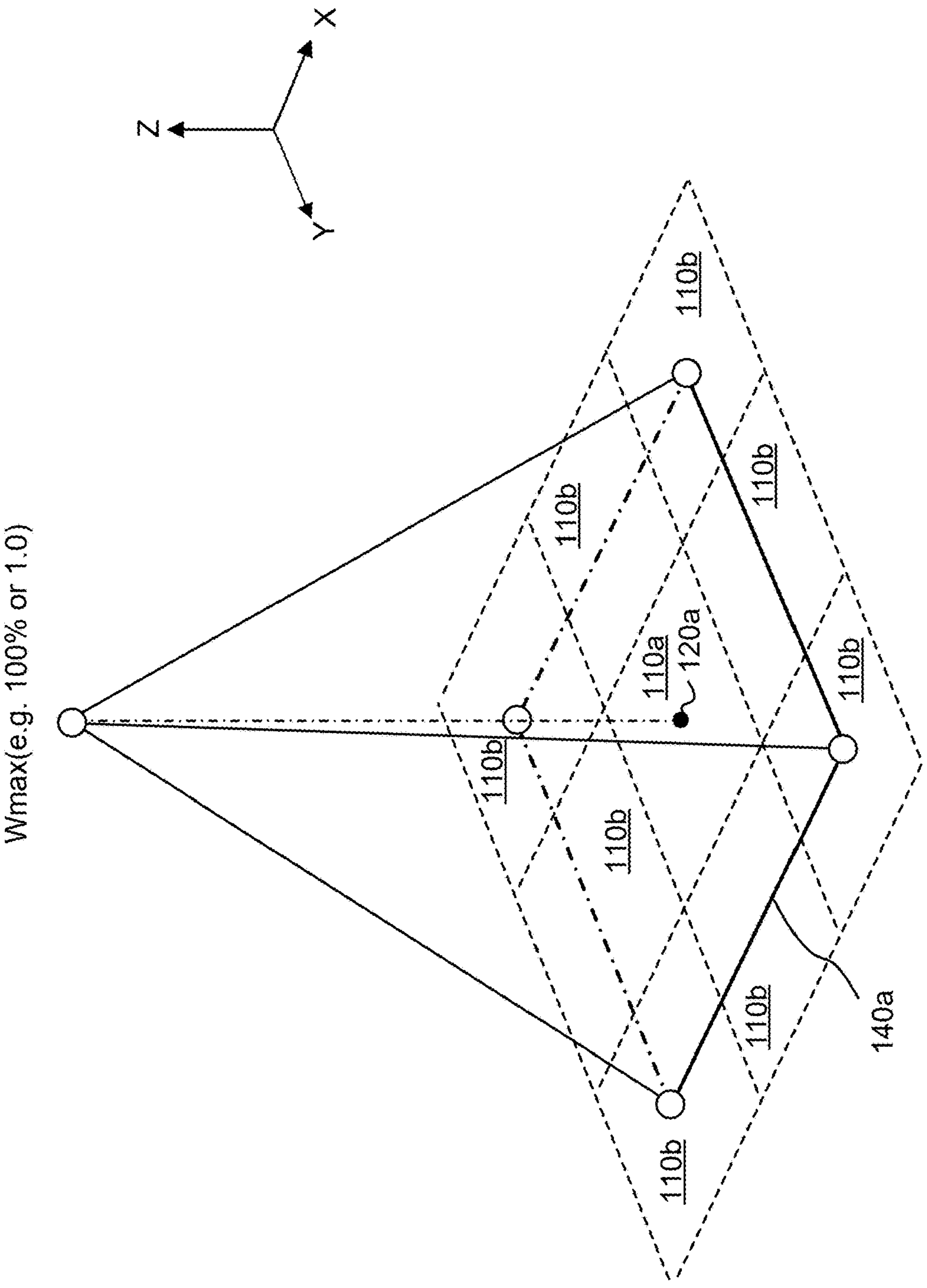
FIG. 7 is a three-dimensional (3D) graph showing example filter coefficients defined for pixels of a target part selected for a light source of interest.

FIG. 7 is a three-dimensional (3D) graph showing example filter coefficients defined for the pixels of the target part selected for the light source 210 of interest, which corresponds to the zone 110*a*. The numeral "140*a*" denotes the target part selected for the light source 210 of interest. It is noted that the outer boundary of the target part 140*a* selected for the light source 210 of interest coincides with the boundary of the corresponding region 130*a* defined for that light source 210 shown in FIG. 6.

In the shown example, the filter coefficients defined for the pixels of the target part 140*a* increase as the respective distances between the pixels of the target part 140*a* of the input image and the center of the zone 110*a* (i.e., the projection of the light source 210 of interest onto the display panel 100) decrease. More specifically, the filter coefficient for the pixel positioned at the center of the zone 110*a* is Wmax (e.g., 100% or 1.0), which is the maximum filter coefficient, and the filter coefficients for the pixels positioned at the boundary of the target part 140*a* are zero. The filter coefficients defined for other pixels of the target part 140*a* are values between zero and Wmax. The filter coefficients thus defined are applied to the pixel data of the respective pixels of the target part 140 to generate the filtered image part. As discussed below later, the filtered image part generated for each light source 210 is used to determine the luminance level of that light source 210. The filter coefficients for the pixels of other target parts for other light sources 210 may be defined in a similar manner.

Referring back to FIG. 5, in step 506, the image analysis circuit 330 analyzes the filtered image part generated for each light source 210 to generate analysis data. In one implementation, the analysis data may include average picture levels (APLs) of the filtered image parts generated for the respective light sources 210. The APL of a filtered image part is the average of the pixel luminance levels of the filtered image part. In implementations where the analysis data includes the APLs of the filtered image parts, the backlight control circuit 340 may be configured to determine the backlight values for the respective light sources 210 based on the APLs of the filtered image parts generated for the respective light sources 210.

Figure 8:
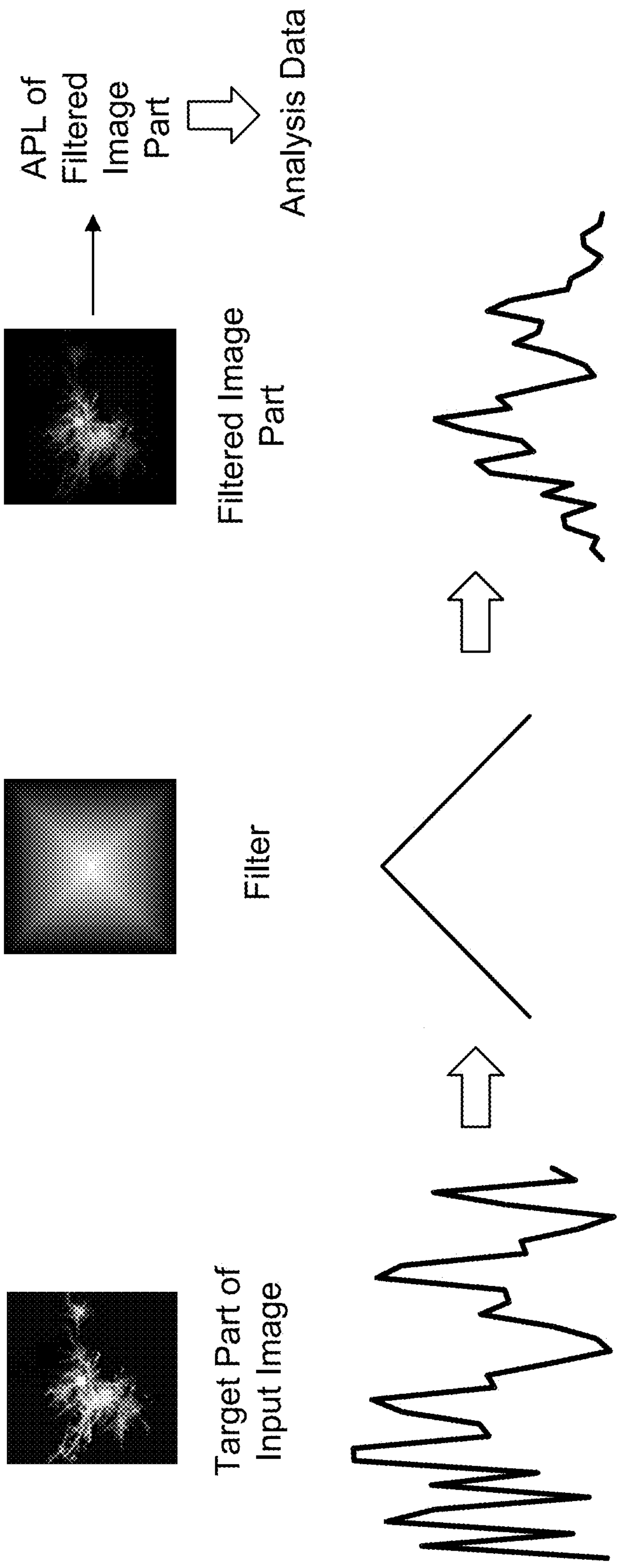
FIG. 8 shows a summary of image processing performed in an image analysis circuit, according to one or more embodiments.

FIG. 8 shows a summary of the image processing performed in the image analysis circuit 330, according to one or more embodiments. The image analysis circuit 330 is configured to first select the target part of the input image for each light source 210. As discussed above, the target part of the input image for each light source 210 is selected such that the target part is displayed in the corresponding region 130*a* of the display panel 100, as described in relation to FIG. 6. The image analysis circuit 330 is further configured to apply a directivity filter to the target part selected for each light source 210 to generate the filtered image part. The image analysis circuit 330 is further configured to generate the analysis data based on the filtered image parts generated for the respective light sources 210. In one implementation, the analysis data includes the APLs of the filtered image parts generated for the respective light sources 210. The APLs of the filtered image parts may be used to determine the backlight values for the respective light sources 210.

The present disclosure recognizes that in order to achieve an improved image quality based on the local dimming function, it would be advantageous for the directivity filter to be appropriately tuned. The tuning of the directivity filter may be performed during a tuning or calibration process of the display device. Alternatively, the directivity filter may be tuned during normal use of the display device. In various embodiments, the directivity filter may be tuned based on measurements of the optical characteristics of the light sources of the backlight device. For example, luminance distributions on the display panel may be measured with various test patterns (or evaluation patterns) of the light sources to evaluate the light directivity characteristics of the light sources, and the directivity filter may be tuned based on the measured luminance distributions.

One approach to accurately evaluate the light directivity characteristics of the light sources may be to use an increased number of test patterns to measure the optical characteristics of the light sources. However, using an increased number of test patterns may increase the turn-around time (TAT) of tuning the directivity filter. Therefore, in certain embodiments, the directivity filter may be appropriately tuned with a reduced number of test patterns. The following is a detailed description of embodiments for appropriately tuning the directivity filter to achieve improved image quality with a reduced number of test patterns.

Figure 9A:
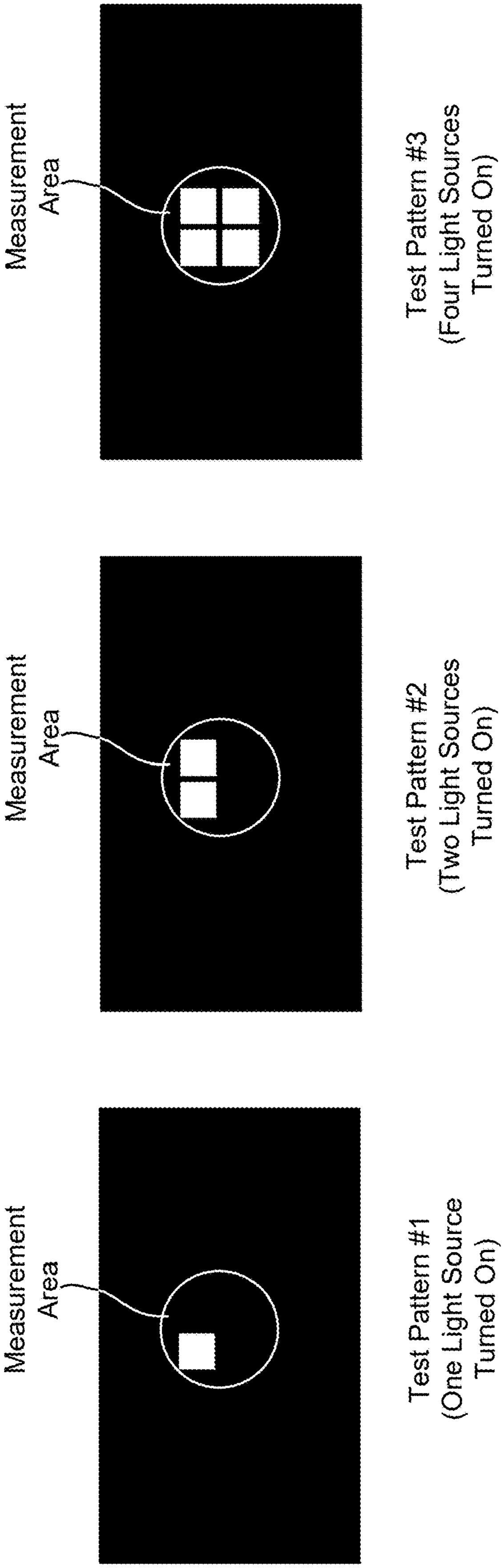
FIG. 9A shows example test patterns, according to one or more embodiments.
Figure 9B:
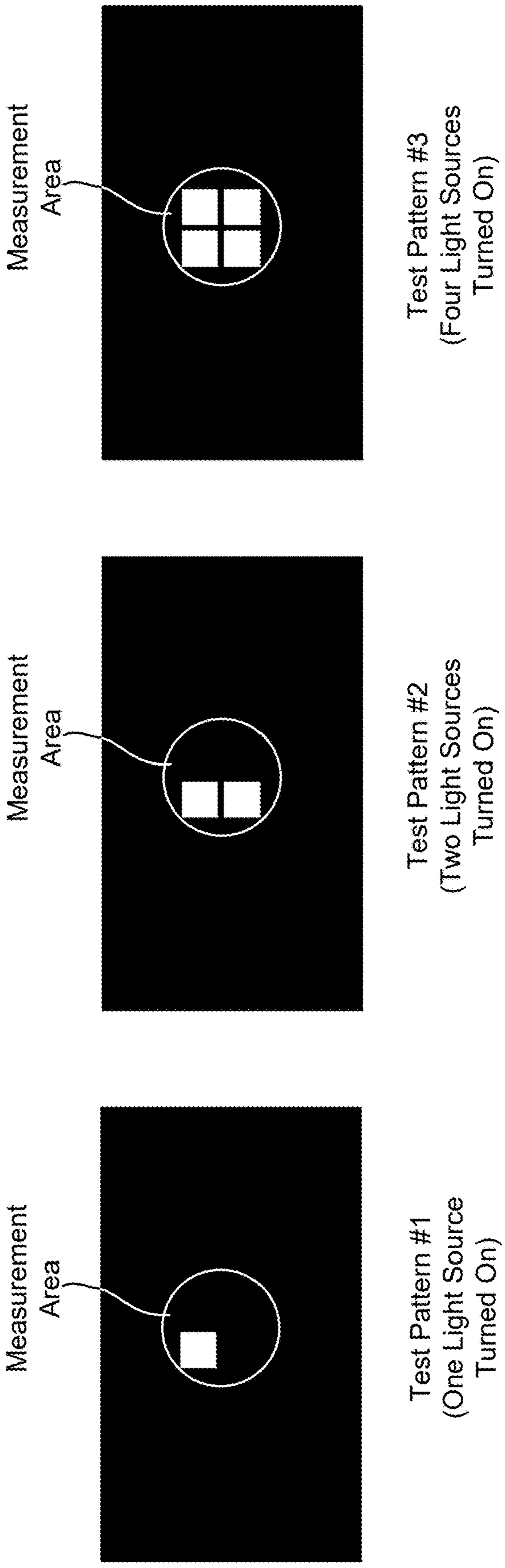
FIG. 9B shows example test patterns, according to other embodiments.

In one or more embodiments, the directivity filter may be tuned based on measurements using test patterns #1, #2, and #3 shown in FIGS. 9A and 9B. Test pattern #1 is a pattern in which one light source is "turned on". The term "turned on" may mean that the light source is driven to emit light at a predetermined brightness level (e.g., the maximum allowed brightness level). Test pattern #2 is a pattern in which two light sources in one row or column are turned on. It is noted that FIG. 9A shows test pattern #2 in which two light sources in one row are turned on, and FIG. 9B shows test pattern #2 in which two light sources in one column are turned on. Test pattern #3 is a pattern in which all the four light sources are turned on. These test patterns are associated with four light sources (e.g., light sources 210 shown in FIGS. 1 to 3) arranged in two rows and two columns and are determined under the assumption that the light sources of the backlight system have substantially the same light distribution characteristics. Other test patterns and other numbers of light sources arranged in other configurations are possible. The tuning process involves illuminating the display panel 100 with test patterns #1, #2, and #3 and measuring the luminance levels of a measurement area for test patterns #1, #2, and #3, respectively.

Figure 9C:
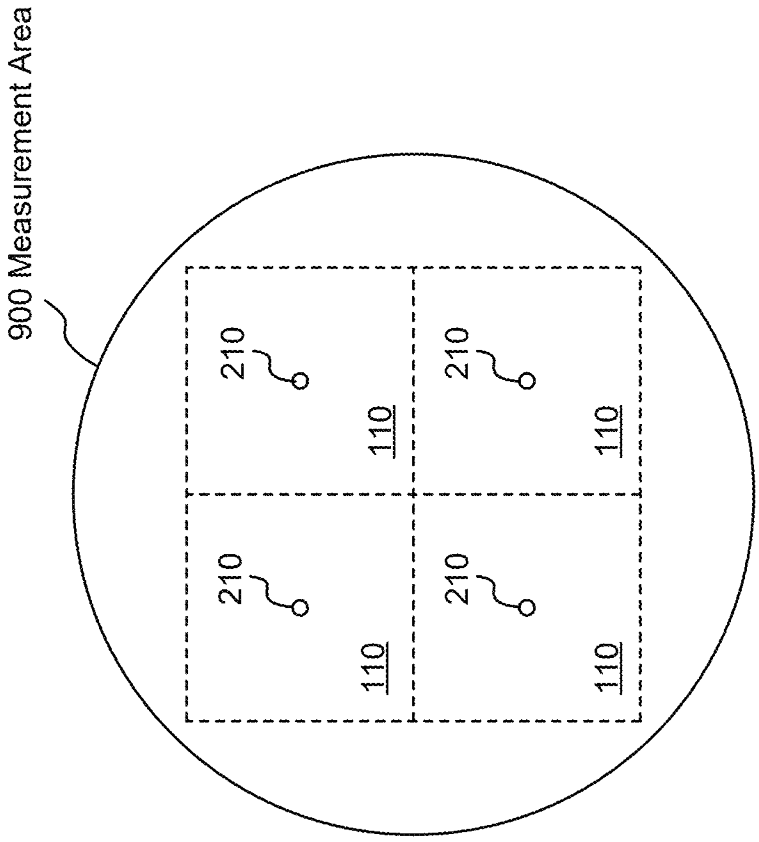
FIG. 9C shows an example arrangement of a measurement area, according to one or more embodiments.

FIG. 9C shows an example arrangement of the measurement area, denoted by numeral 900, according to one or more embodiments. The measurement area 900 is defined to encompass four zones 110 corresponding to the four light sources 210 relevant to the tuning of the directivity filter. It should be noted that the projections of the four light sources 210 onto the display panel 100 are located at the centers of the four zones 110. In the shown embodiment, the measurement area 900 is defined to have a circular shape encompassing the four zones 110. In order to evaluate the light directivity characteristics of the light sources 210, the measurement area 900 is defined to be as small as possible while encompassing the four zones 110. In one implementation, the measurement area 900 is defined such that a portion of the light emitted from each of the four light sources 210 reaches a portion of the display panel 100 outside of the measurement area 900. In some embodiments, the measurement area 900 is defined such that the boundary of the measurement area 900 just circumscribes the four zones 110.

Figure 10:
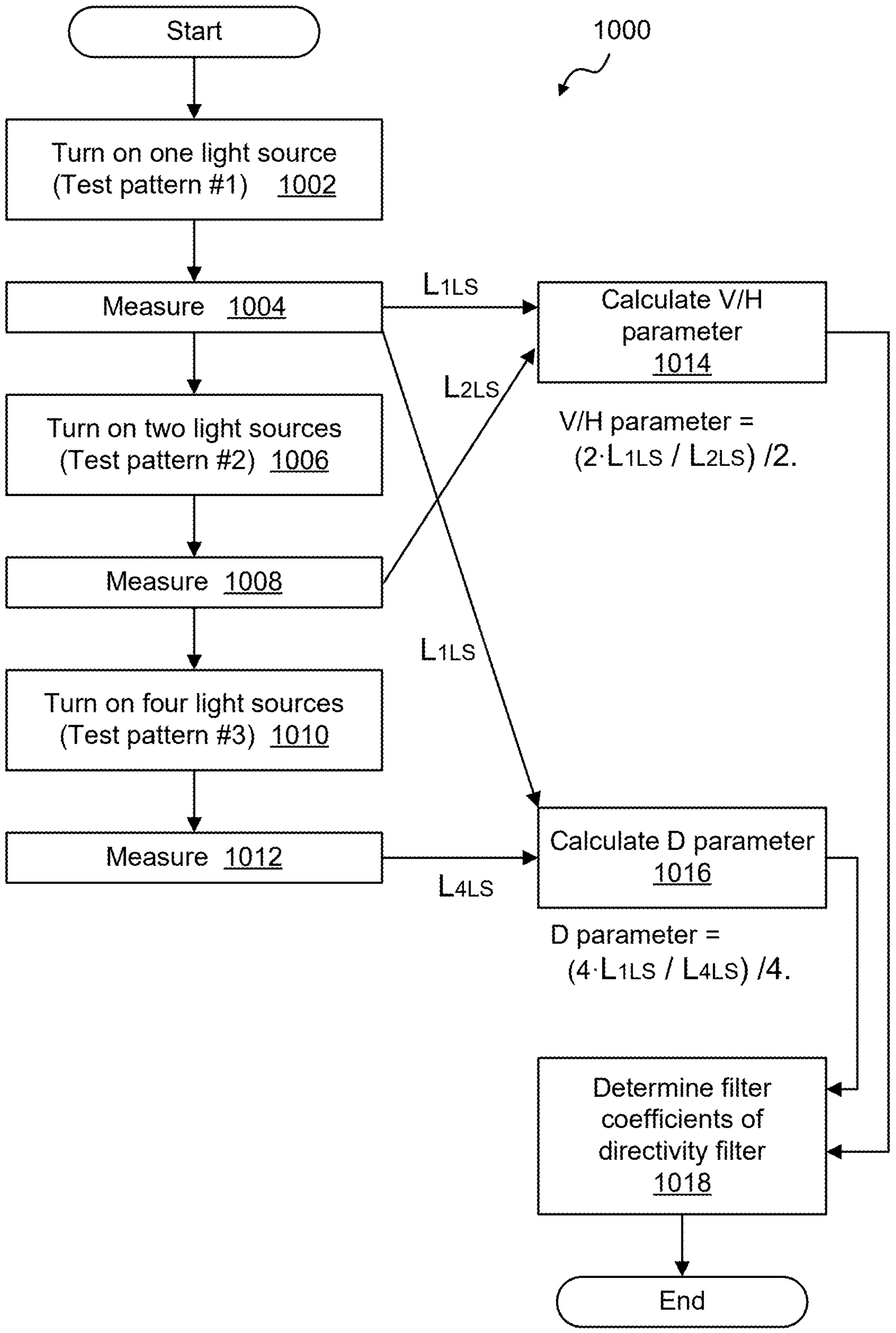
FIG. 10 shows an example process for tuning a directivity filter, according to one or more embodiments.

FIG. 10 shows an example process 1000 for tuning the directivity filter, according to one or more embodiments. It will be appreciated that any of the following steps may be performed in any suitable order unless the order shown is necessary, as will be apparent to those of skill in the art. In step 1002, one of the four light sources 210 relevant to the tuning is turned on to illuminate the display panel with test pattern #1. This is followed by measuring, in step 1004, the luminance level of the measurement area 900 while the display panel is illuminated with test pattern #1. The luminance level measured in step 1004 is referred to as the luminance level $L_{1LS}$.

In step 1006, two light sources 210 in one row (or one column) are turned on to illuminate the display panel with test pattern #2. This is followed by measuring, in step 1008, the luminance level of the measurement area 900 while the display panel is illuminated with test pattern #2. The luminance level measured in step 1008 is referred to as the luminance level $L_{2LS}$.

In step 1010, all of the four light sources 210 relevant to the tuning are turned on to illuminate the display panel with test pattern #3. This is followed by measuring, in step 1012, the luminance level of the measurement area 900 while the display panel is illuminated with test pattern #3. The luminance level measured in step 1012 is referred to as the luminance level $L_{4LS}$.

In step 1014, a vertical/horizontal (V/H) parameter is calculated based on the luminance level $L_{1LS}$ measured in step 1004 and the luminance level $L_{2LS}$ measured in step 1008. The V/H parameter is indicative of the light directivity characteristics (or light distribution characteristics) of the light sources 210 in the vertical and horizontal directions. In one or more embodiments, the V/H parameter is calculated according to the following expression (1):

$$(V/H \text{ parameter}) = \frac{1}{2}\left(\frac{2 \cdot L_{1LS}}{L_{2LS}}\right). \quad (1)$$

In step 1016, a diagonal (D) parameter is calculated based on the luminance level $L_{1LS}$ measured in step 1004 and the luminance level $L_{4LS}$ measured in step 1012. The D parameter is indicative of the light directivity characteristics (or light distribution characteristics) of the light sources 210 in the diagonal directions. In one or more embodiments, the D parameter is calculated according to the following expression (2):

$$(D \text{ parameter}) = \frac{1}{4}\left(\frac{4 \cdot L_{1LS}}{L_{4LS}}\right). \quad (2)$$

Figure 11:
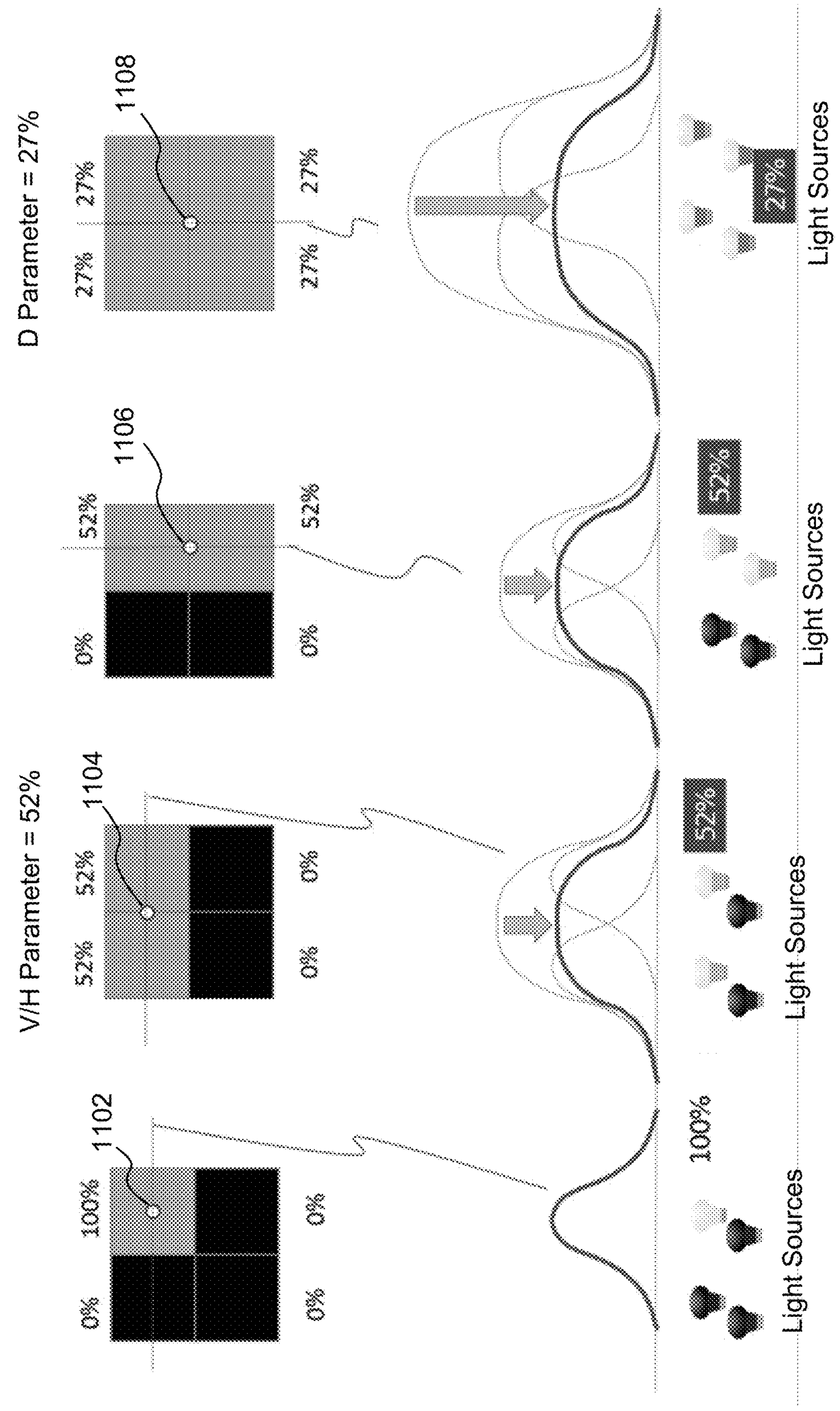
FIG. 11 is a diagram explaining technical meanings of a vertical/horizontal (V/H) parameter and a diagonal (D) parameter, according to one or more embodiments.

FIG. 11 is a diagram explaining the technical meanings of the V/H and D parameters calculated by expressions (1) and (2), according to one or more embodiments. Shown in FIG. 11 are four images displayed in four zones arranged in two rows and two columns. The leftmost image contains an object 1102 located at the center of the upper right zone, and the second image from the left contains an object 1104 located at the boundary between the upper left zone and the upper right zone. The second image from the right contains an object 1106 located at the boundary between the upper right zone and the lower right zone, and the rightmost image contains an object 1108 located at the common corner of the four zones.

In one or more embodiments, the V/H and D parameters calculated according to expressions (1) and (2) cause the luminance levels listed below to be substantially the same:

(a) The luminance of the object 1102 for the case when one light source illuminates the upper right zone with a luminance level of 100%.

(b) The luminance of the object 1104 for the case where two light sources illuminate the zones in the upper row with a luminance level equal to the V/H parameter (e.g., 52% in FIG. 11).

(c) The luminance of the object 1106 for the case where two light sources illuminate the zones in the right column with a luminance level equal to the V/H parameter (e.g., 52% in FIG. 11).

(d) The luminance of the object 1108 for the case where four light sources illuminate the four zones with a luminance level equal to the D parameter (e.g., 27% in FIG. 11).

The light directivity characteristics (or the light distribution characteristics) of the light sources are well represented by the V/H and D parameters calculated in this way.

Figure 12:
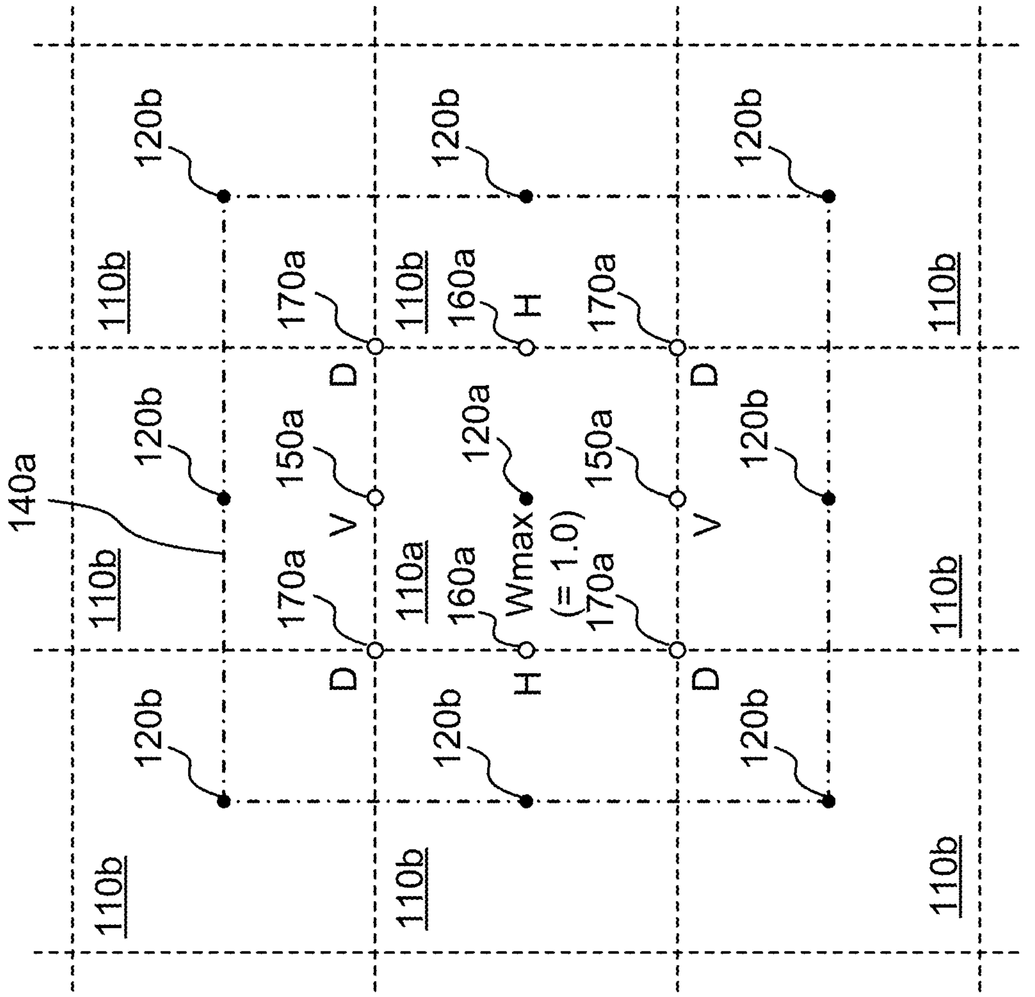
FIG. 12 is a diagram showing example filter coefficients of a directivity filter, according to one or more embodiments.
Figure 13:
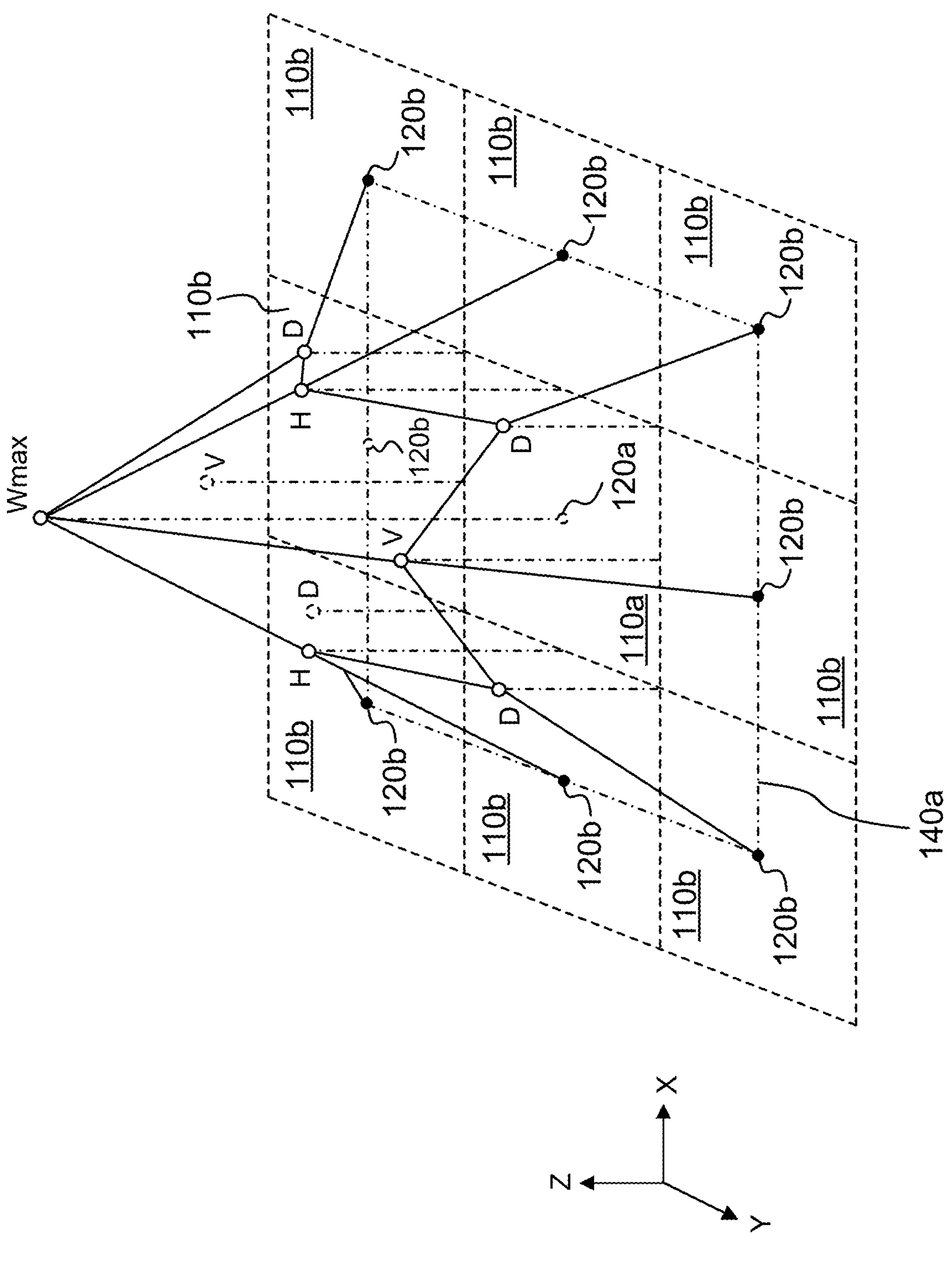
FIG. 13 is a three-dimensional graph showing the example filter coefficients of the directivity filter of FIG. 12, according to one or more embodiments.

Referring back to FIG. 10, in step 1018, filter coefficients of the directivity filter are determined based on the V/H parameter and the D parameter thus calculated. FIG. 12 is a diagram showing example filter coefficients of the directivity filter, according to one or more embodiments, and FIG. 13 is an illustrative diagram showing the example filter coefficients in the form of a 3D graph. In FIGS. 12 and 13, the numeral 110*a* denotes the zone 110 corresponding to the light source 210 of interest, and the numerals 110*b* denote the eight zones 110 surrounding the zone 110*a*. The numeral 120*a* denotes the center of the zone 110*a*, and the numerals 120*b* denote the respective centers of the surrounding zones 110*b*. It is noted that the projection of each light source 210 onto the display panel 100 is positioned at the center of the zone 110 corresponding to that light source 210. The numeral 140*a* denotes the target part of the input image selected for the light source 210 of interest.

Referring to FIG. 12, in one or more embodiments, the filter coefficient for the pixel located at the center 120*a* of the zone 110*a* corresponding to the light source 210 of interest is determined to be the maximum filter coefficient Wmax, which may be 1.0 or 100%. Meanwhile, the filter coefficients of the pixels located at the boundary of the target part 140*a* selected for the light source 210 of interest are determined to be 0% or zero.

The filter coefficients of the pixels located at the midpoints 150*a* of the horizontal edges of the zone 110*a* corresponding to the light source 210 of interest are determined based on the V/H parameter. In one implementation, the filter coefficients of the pixels located at the midpoints 150*a* are determined to be equal to the V/H parameter. In the example shown in FIG. 11, the filter coefficients of the pixels located at the midpoints 150*a* are 52% or 0.52.

The filter coefficients of the pixels located at the midpoints 160*a* of the vertical edges of the zone 110*a* corresponding to the light source 210 of interest are also determined based on the V/H parameter. In one implementation, the filter coefficients of the pixels located at the midpoints 160*a* are determined to be equal to the V/H parameter. In the example shown in FIG. 11, the filter coefficients of the pixels located at the midpoints 160*a* are 52% or 0.52.

The filter coefficients of the pixels located at the corners 170*a* of the zone 110*a* corresponding to the light source 210 of interest are determined based on the D parameter. In one implementation, the filter coefficients of the pixels located at the corners 170*a* are determined to be equal to the D parameter. In the example shown in FIG. 11, the filter coefficients of the pixels located at the corners 170*a* are 27% or 0.27.

The filter coefficients of other pixels of the target part 140*a* selected for the light source 210 of interest are determined by interpolating the filter coefficients of the pixels determined as described above. In one implementation, the filter coefficients of other pixels of the target part 140*a* are determined according to the 3D graph shown in FIG. 13.

It should be noted that the above-described tuning process described in relation to FIGS. 9A to 13 uses only three test patterns (test patterns #1, #2, and #3) to tune the directivity filter. The tuning process of the present disclosure enables a reduction of the TAT of the tuning of the directivity filter.

In one or more embodiments, the filter coefficients of the directivity filter generated as described above may be stored in the display driver 300. In other embodiments, the V/H and D parameters generated as described above may be stored in the display driver 300, and the display driver 300 may be configured to generate the filter coefficients of the directivity filter based on the stored V/H and D parameters. Of course, it will be appreciated that the filter coefficients or V/H and D parameters may be stored outside of the display driver in a separate memory.

Figure 14:
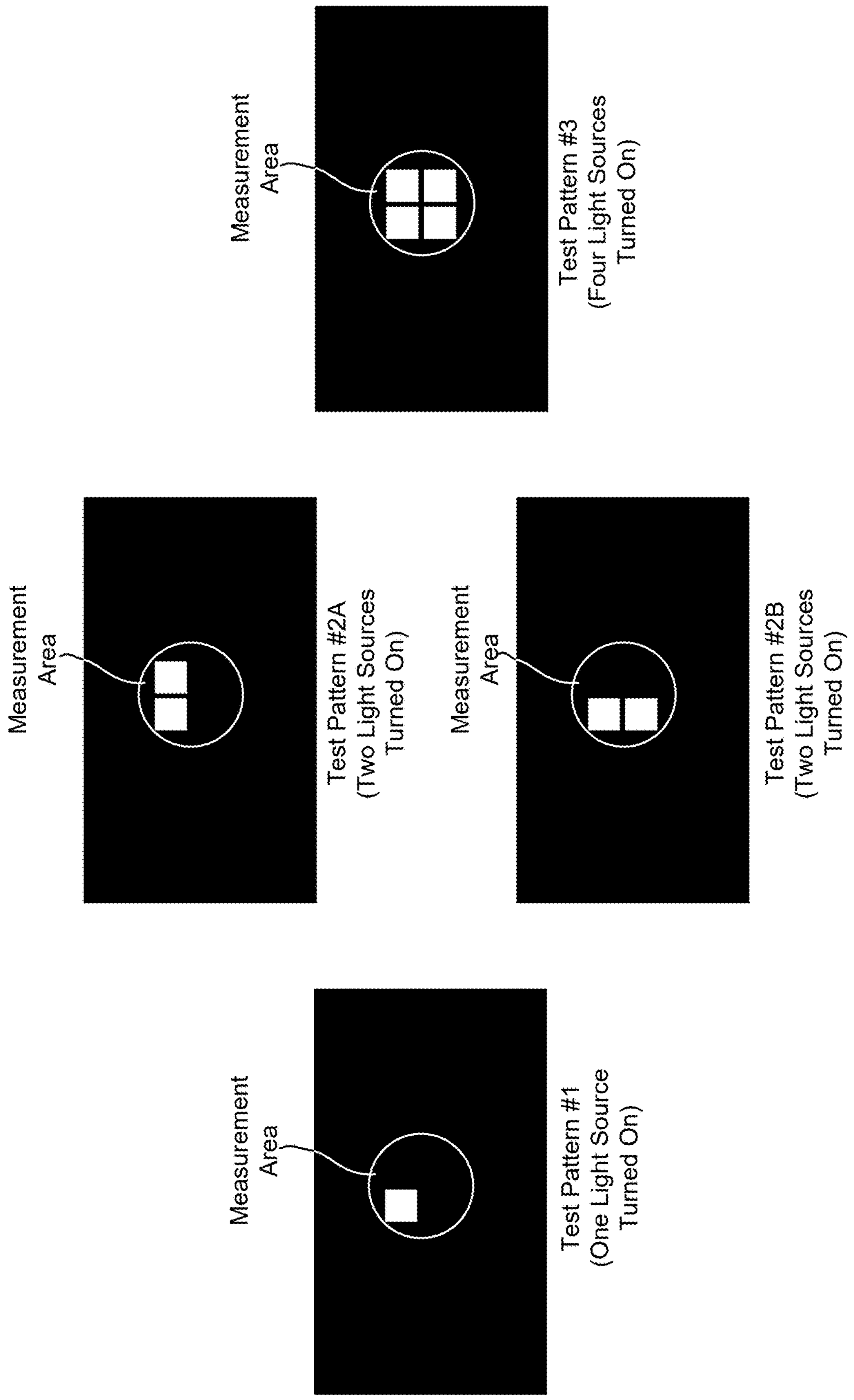
FIG. 14 shows example test patterns, according to still other embodiments.

FIG. 14 shows an example set of test patterns used to determine the filter coefficients of the directivity filter, according to other embodiments. In the shown embodiment, test patterns #1, #2A, #2B, and #3 are used to determine the filter coefficients of the directivity filter, wherein test pattern #1 is a pattern in which one light source is "turned on", test pattern #2A is a pattern in which two light sources in one row are turned on, test pattern #2B is a pattern in which two light sources in one column are turned on, and test pattern #3 is a pattern in which all four light sources are turned on. These test patterns are associated with four light sources (e.g., the light sources 210 shown in FIGS. 1 to 3) arranged in two rows and two columns and are determined under the assumption that the light sources of the backlight system have substantially the same light distribution characteristics while the vertical height of the zones 110 is different from the horizontal width of the zones 110. The process of determining the filter coefficients of the directivity filter may include measuring the luminance levels of the measurement area for test patterns #1, #2A, #2B, and #3, respectively, calculating V, H, and D parameters based on the measured luminance levels, and calculating the filter coefficients of the directivity filter based on the V, H, and D parameters, wherein the V parameter is indicative of the light directivity characteristics (or light distribution characteristics) of the light sources 210 in the vertical direction, and the H parameter is indicative of the light directivity characteristics of the light sources 210 in the horizontal direction. It should be noted that when the test patterns shown in FIG. 14 are used, the V and H parameters are calculated instead of the V/H parameter. Using the V and H parameters to determine the filter coefficients of the directivity filter may be advantageous in the case where the vertical height of the zones 110 is different from the horizontal width of the zones 110 and/or in the case where the light directivity characteristics (or light distribution characteristics) of the light sources 210 in the vertical direction are different from the light directivity characteristics in the horizontal direction.

Figure 15:
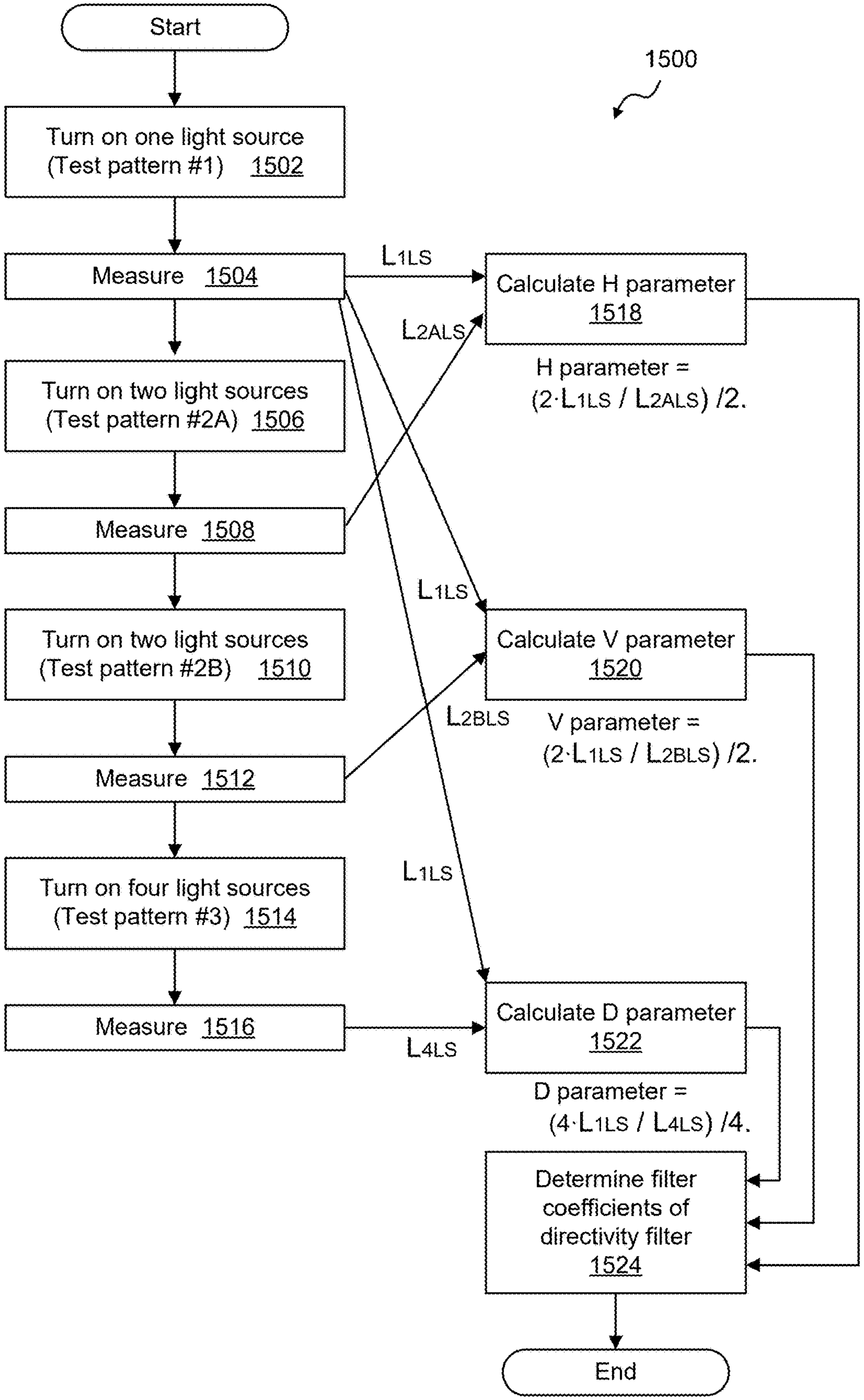
FIG. 15 shows an example process for calculating V, H, and D parameters and determining the filter coefficients of a directivity filter, according to one or more embodiments.

FIG. 15 shows an example process 1500 for calculating the V, H, and D parameters and determining the filter coefficients of the directivity filter based on the V, H, and D parameters, according to one or more embodiments. It will be appreciated that that any of the following steps may be performed in any suitable order except where the order shown is necessary, as will be apparent to those of skill in the art.

In step 1502, one of the four light sources 210 relevant to the tuning is turned on to illuminate the display panel with test pattern #1. This is followed by measuring, in step 1504, the luminance level of the measurement area while the display panel is illuminated with test pattern #1. The luminance level measured in step 1504 is referred to as the luminance level $L_{1LS}$.

In step 1506, two light sources 210 in one row are turned on to illuminate the display panel with test pattern #2A. This is followed by measuring, in step 1508, the luminance level of the measurement area while the display panel is illuminated with test pattern #2A. The luminance level measured in step 1508 is referred to as the luminance level $L_{2ALS}$.

In step 1510, two light sources 210 in one column are turned on to illuminate the display panel with test pattern #2B. This is followed by measuring, in step 1512, the luminance level of the measurement area while the display panel is illuminated with test pattern #2B. The luminance level measured in step 1512 is referred to as the luminance level $L_{2BLS}$.

In step 1514, all of the four light sources 210 relevant to the tuning are turned on to illuminate the display panel with test pattern #3. This is followed by measuring, in step 1516, the luminance level of the measurement area while the display panel is illuminated with test pattern #3. The luminance level measured in step 1516 is referred to as the luminance level $L_{4LS}$.

In step 1518, the H parameter is calculated based on the luminance level $L_{1LS}$ measured in step 1504 and the luminance level $L_{2ALS}$ measured in step 1508. In one or more embodiments, the H parameter is calculated according to the following expression (3):

$$(H\ \text{parameter}) = \frac{1}{2}\left(\frac{2 \cdot L_{1LS}}{L_{2BLS}}\right). \tag{3}$$

In step 1520, the V parameter is calculated based on the luminance level $L_{1LS}$ measured in step 1504 and the luminance level $L_{2BLS}$ measured in step 1512. In one or more embodiments, the V parameter is calculated according to the following expression (4):

$$(V\ \text{parameter}) = \frac{1}{2}\left(\frac{2 \cdot L_{1LS}}{L_{2BLS}}\right). \tag{4}$$

In step 1522, the D parameter is calculated based on the luminance level $L_{1LS}$ measured in step 1504 and the luminance level $L_{4LS}$ measured in step 1516. In one or more embodiments, the D parameter is calculated according to the following expression (5):

$$(D\ \text{parameter}) = \frac{1}{4}\left(\frac{4 \cdot L_{1LS}}{L_{4LS}}\right). \tag{5}$$

In step 1524, the filter coefficients of the directivity filter are determined based on the V, H, and D parameters thus calculated. In one or more embodiments, the filter coefficients of the directivity filter may be determined in a manner similar to that shown in FIGS. 12 and 13, except that the V and H parameters are used instead of the V/H parameter. Details of determining the filter coefficients of the directivity filter based on the V, H, and D parameters for a light source of interest are described below.

Referring to FIG. 12 again, in one or more embodiments, the filter coefficient for the pixel located at the center 120*a* of the zone 110*a* corresponding to the light source 210 of interest is determined to be the maximum filter coefficient Wmax, which may be 1.0 or 100%. Meanwhile, the filter coefficients of the pixels located at the boundary of the target part 140*a* selected for the light source 210 of interest are determined to be 0% or zero.

The filter coefficients of the pixels located at the midpoints 150*a* of the horizontal edges of the zone 110*a* corresponding to the light source 210 of interest are determined based on the V parameter. In one implementation, the filter coefficients of the pixels located at the midpoints 150*a* are determined to be equal to the V parameter.

The filter coefficients of the pixels located at the midpoints 160*a* of the vertical edges of the zone 110*a* corresponding to the light source 210 of interest are determined based on the H parameter. In one implementation, the filter coefficients of the pixels located at the midpoints 160*a* are determined to be equal to the H parameter.

The filter coefficients of the pixels located at the corners 170*a* of the zone 110*a* corresponding to the light source 210 of interest are determined based on the D parameter. In one implementation, the filter coefficients of the pixels located at the corners 170*a* are determined to be equal to the D parameter.

The filter coefficients of other pixels of the target part 140*a* selected for the light source 210 of interest are determined by interpolating the filter coefficients of the pixels determined as described above. In one implementation, the filter coefficients of other pixels of the target part 140*a* are determined according to the 3D graph shown in FIG. 13.

Figure 16:
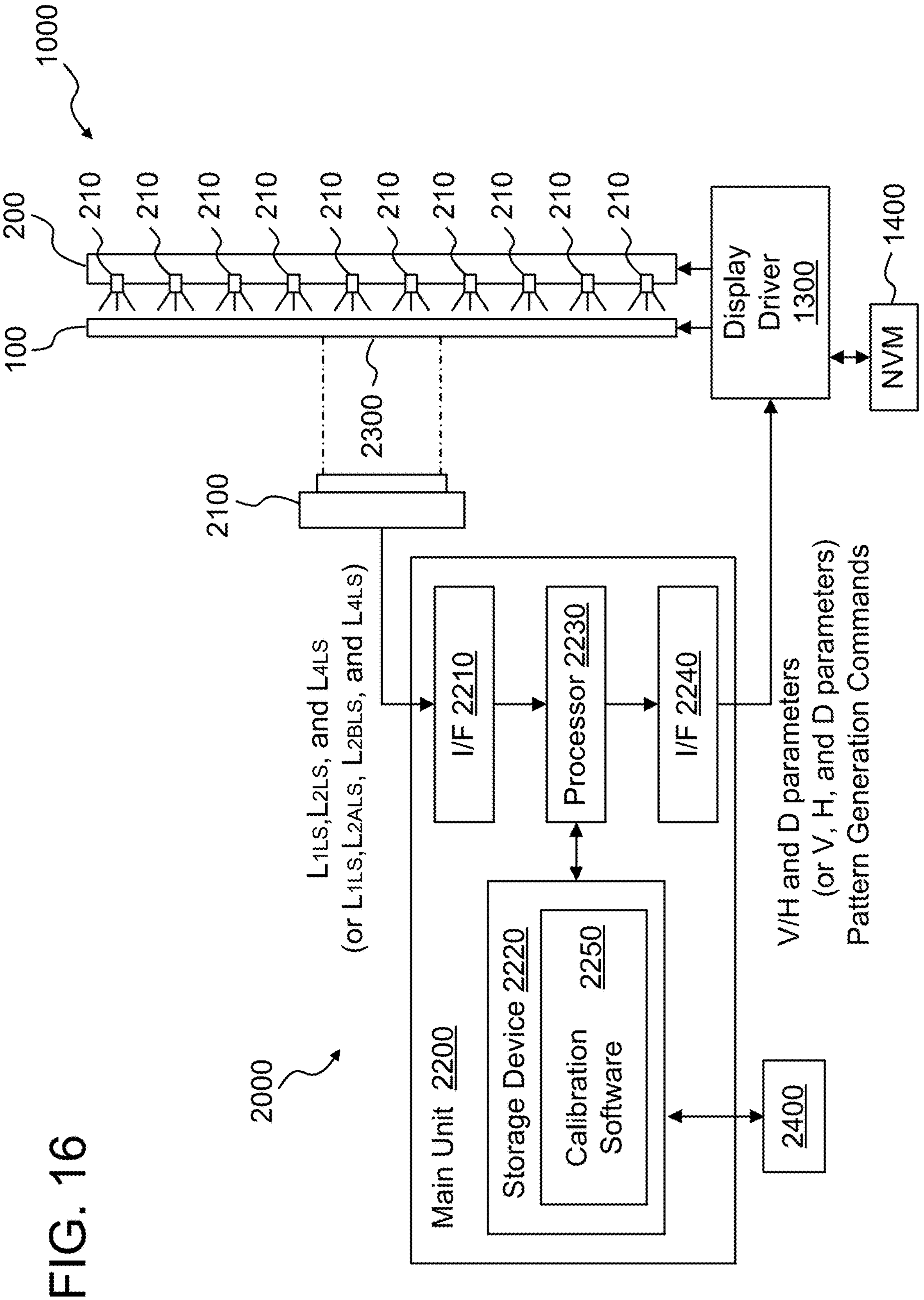
FIG. 16 shows an example configuration of a calibration system, according to one or more embodiments.

FIG. 16 shows an example configuration of a calibration system 2000 configured to perform the tuning process for a display driver 1300, according to one or more embodiments. The calibration system 2000 may be configured to generate the V/H and D parameters as shown in FIG. 10 or to generate the V, H, and D parameters as shown in FIG. 15. The V/H and D parameters or the V, H, and D parameters generated by the calibration system 2000 are provided to the display driver 1300. As described above, the V/H and D parameters or the V, H, and D parameters are used to determine the filter coefficients of the directivity filter in the display driver 1300.

In one or more embodiments, the calibration system 2000 includes a luminance measurement device 2100 and a main unit 2200. The luminance measurement device 2100 may be configured to measure the luminance level of the measurement area, denoted by numeral 2300 in FIG. 16, defined on the display panel 100 as shown in FIGS. 9A, 9B, 9C, and 14. In some embodiments, e.g., the embodiments shown in FIGS. 9A, 9B, 9C, and 10, the luminance measurement device 2100 may be configured to measure: (1) the luminance level $L_{1LS}$ of the measurement area while one light source 210 is turned on according to test pattern #1; (2) the luminance level $L_{2LS}$ of the measurement area while two light sources 210 are turned on according to test pattern #2; and (3) the luminance level $L_{4LS}$ of the measurement area while four light sources 210 are turned on according to test pattern #3. In other embodiments, such as the embodiments shown in FIGS. 14 and 15, the luminance measurement device 2100 may be configured to measure: (1) the luminance level $L_{1LS}$ of the measurement area while one light source 210 is turned on according to test pattern #1; (2) the luminance level $L_{2ALS}$ of the measurement area while two light sources 210 are turned on according to test pattern #2A; (3) the luminance level $L_{2BLS}$ of the measurement area while two light sources 210 are turned on according to test pattern #2B; and (4) the luminance level $L_{4LS}$ of the measurement area while four light sources 210 are turned on according to test pattern #3.

In one or more embodiments, the main unit 2200 includes an interface (I/F) circuit 2210, a storage device 2220, a processor 2230, and an interface circuit 2240. In one or more embodiments, the interface circuit 2210 is configured to acquire the luminance levels of the measurement area 2300 measured by the luminance measurement device 2100. In some embodiments, the measured luminance levels may include the luminance levels $L_{1LS}$, $L_{2LS}$, and $L_{4LS}$ measured according to the process shown in FIG. 10. In other embodiments, the measured luminance levels may include the luminance levels $L_{1LS}$, $L_{2ALS}$, $L_{2BLS}$, and $L_{4LS}$ measured according to the process shown in FIG. 15.

The storage device 2220 is configured as a non-transitory tangible computer-readable storage medium that stores calibration software 2250 therein. The calibration software 2250 includes program code (e.g., computer executable instructions) that, when executed, causes the processor 2230 to calculate the V/H and D parameters or the V, H, and D parameters. The calibration software 2250 may be installed on the storage device 2220 using a non-transitory tangible computer-readable recording medium 2400 that records the calibration software 2200. Alternatively, the calibration software 2250 may be provided to the calibration system 2000 as a computer program product downloadable from a server. The storage device 2220 may be further configured to store other data used to calculate the V/H and D parameters or the V, H, and D parameters. Examples of the stored data may include, but are not limited to, the measured luminance levels and intermediate data generated in the calculation. As another alternative, the methods described herein may be implemented by firmware or discrete circuits.

The processor 2230 is configured to execute the calibration software 2250 to calculate the V/H and D parameters or the V, H, and D parameters. In some embodiments, such as the embodiment shown in FIG. 10, the processor 2230 may be configured to calculate the V/H and D parameters based on the luminance levels $L_{1LS}$, $L_{2LS}$, and $L_{4LS}$. In other embodiments, such as the embodiment shown in FIG. 15, the processor 2230 may be configured to calculate the V, H, and D parameters based on the luminance levels $L_{1LS}$, $L_{2ALS}$, $L_{2BLS}$, and $L_{4LS}$. The processor 2230 is further configured to provide the V/H and D parameters or the V, H, and D parameters to the interface circuit 2240, and the interface circuit 2240 is configured to provide the calculated V/H and D parameters or the V, H, and D parameters to the display driver 1300.

In some embodiments, a non-volatile memory (NVM) 1400 may be coupled to the display driver 1300, and the display driver 1300 may be configured to store the V/H and D parameters or the V, H, and D parameters in the NVM 1400. In such embodiments, the display driver 1300 may be configured to retrieve the V/H and D parameters or the V, H, and D parameters from the NVM 1400 and calculate the filter coefficients of the directivity filter based on the retrieved V/H and D parameters or the retrieved V, H, and D parameters. Alternatively, the display driver 1300 may include a storage configured to store the V/H and D parameters or the V, H, and D parameters in a non-volatile manner.

In other embodiments, the calibration system 2000 may be configured to calculate the filter coefficients of the directivity filter based on the V/H and D parameters or the V, H, and D parameters, and to provide the calculated filter coefficients to the display driver 1300. The display driver 1300 may be configured to store the filter coefficients of the directivity filter in the NVM 1400 or in a storage integrated within the display driver 1300, and to use the stored filter coefficients to generate the analysis data as described in relation to FIGS. 5 and 8.

In some embodiments, the calibration system 2000 may be configured to cause the display driver 1300 to control the light sources 210 of the backlight device 200 to illuminate the display panel 100 with desired test patterns during the tuning of the directivity filter. In such embodiments, the calibration software 2250 may include program code that, when executed, cause the processor 2230 to generate pattern generation commands that instruct the display driver 1300 to illuminate the display panel 100 with desired test patterns, and the interface circuit 2240 may be configured to provide the pattern generation commands to the display driver 1300. In some embodiments (e.g., the embodiments shown in FIGS. 9A and 9B), the calibration software 2250 may generate pattern generation commands to cause the display driver 1300 to illuminate the display panel 100 with test pattern #1 when the luminance level $L_{1LS}$ is measured, with test pattern #2 when the luminance level $L_{2LS}$ is measured, and with test pattern #3 when the luminance level $L_{4LS}$ is measured. In other embodiments (e.g., the embodiment shown in FIG. 14), the calibration software 2250 may generate pattern generation commands to cause the display driver 1300 to illuminate the display panel 100 with test pattern #1 when the luminance level $L_{1LS}$ is measured, with test pattern #2A when the luminance level $L_{2ALS}$ is measured, with test pattern #2B when the luminance level $L_{2BLS}$ is measured, and with test pattern #3 when the luminance level $L_{4LS}$ is measured.

Figure 17:
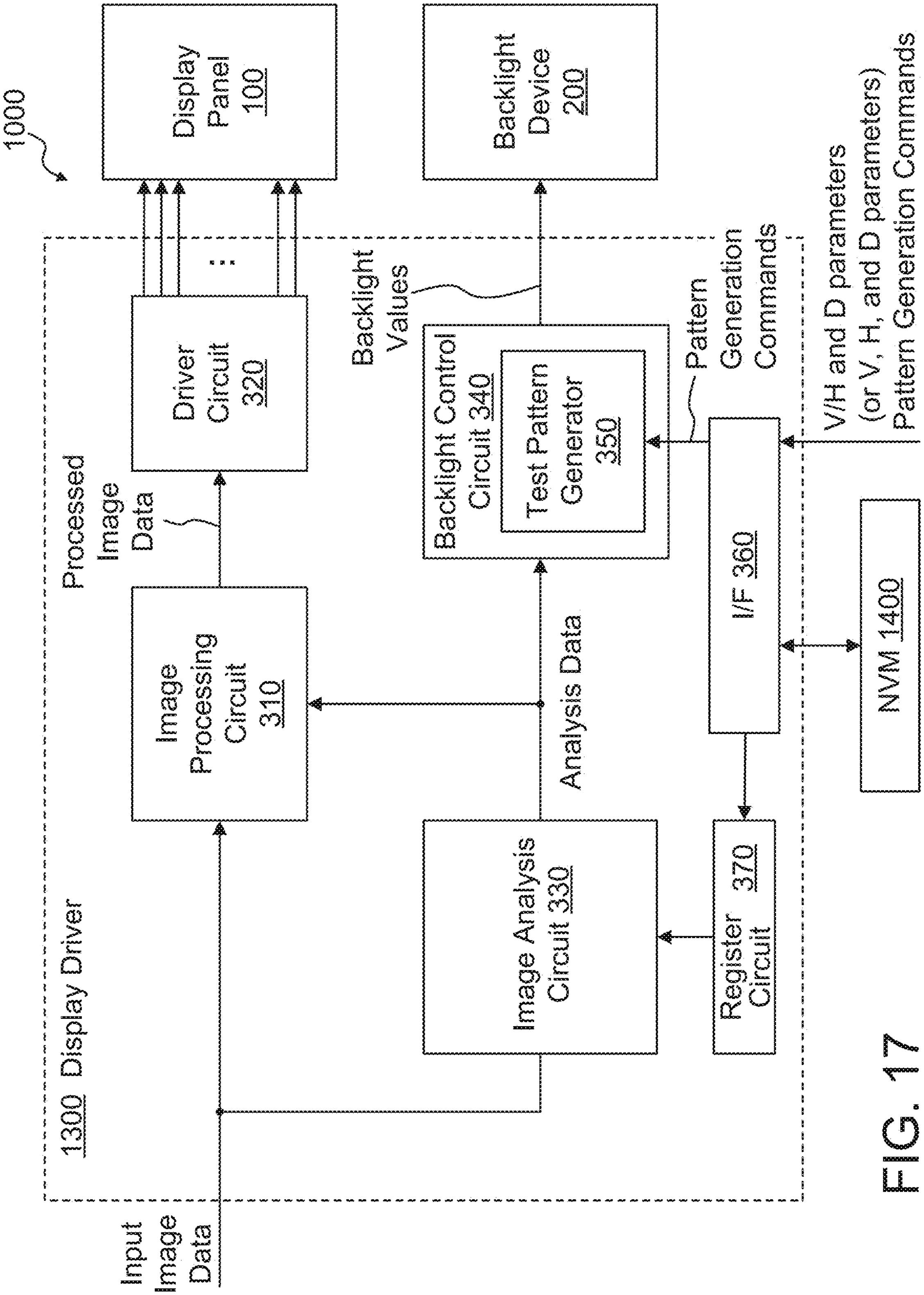
FIG. 17 shows an example configuration of a display driver, according to one or more embodiments.

FIG. 17 shows an example configuration of the display driver 1300 configured to control the backlight device 200 to illuminate the display panel 100 with desired test pattern, according to one or more embodiments. In the shown embodiment, the display driver 1300 includes an interface (I/F) circuit 360 and a register circuit 370, and the backlight control circuit 340 includes a test pattern generator 350. The rest of the display driver 1300 is configured similarly to the display driver 300 shown in FIG. 4. The interface circuit 360 is configured to receive the pattern generation commands from the calibration system 2000 (shown in FIG. 16), and to provide the pattern generation commands to the test pattern generator 350. During the tuning of the directivity filter, the test pattern generator 350 generates the backlight values for the respective light sources 210 in response to the pattern generation commands such that the display panel 100 is illuminated with the desired test patterns, e.g., test patterns #1, #2, and #3 shown in FIGS. 9A and 9B or test patterns #1, #2A, #2B, and #3 shown in FIG. 14. In other embodiments, the test pattern generator 350 may be configured to generate the backlight values in response to commands received from a different external controller to cause the backlight device 200 to illuminate the display panel 100 with the desired test patterns.

The interface circuit 360 may further be configured to receive the V/H and D parameters or the V, H, and D parameters from the calibration system 2000 and store the V/H and D parameters or the V, H, and D parameters in the NVM 1400. The interface circuit 360 may further be configured to retrieve the V/H and D parameters or the V, H, and D parameters from the NVM 1400 upon start-up or power-on reset and store the V/H and D parameters or the V, H, and D parameters in the register circuit 370. The register circuit 370 may be configured to provide the V/H and D parameters or the V, H, and D parameters to the image analysis circuit 330 when the image analysis circuit 330 calculates the filter coefficients of the directivity filter.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:

measuring a first luminance level of a measurement area of a display panel while the display panel is illuminated with four light sources of a backlight device, wherein the four light sources are arranged in two rows and two columns;

measuring a second luminance level of the measurement area while the display panel is illuminated with two of the four light sources, the two of the four light sources being arranged in a same row or a same column;

measuring a third luminance level of the measurement area while the display panel is illuminated with one of the four light sources; and determining, based on the first, second, and third luminance levels of the measurement area, filter coefficients of a directivity filter used for a local dimming function implemented in a display device that includes the display panel, wherein at least certain of the filter coefficients are interpolated from other of the filter coefficients and wherein a subset of the other of the filter coefficients correspond to four times the third luminance level divided by the first luminance level.

2. The method of claim 1, wherein the measurement area is defined such that a portion of light emitted from each of the four light sources reaches a portion of the display panel outside the measurement area.

3. The method of claim 1, wherein a plurality of zones corresponding to a plurality of light sources are defined for the display panel, the plurality of light sources comprising the four light sources, wherein the plurality of zones comprises four zones corresponding to the four light sources, and wherein the measurement area is defined to encompass the four zones.

4. The method of claim 3, wherein the measurement area has a circular shape and circumscribes the four zones corresponding to the four light sources.

5. The method of claim 3, wherein the local dimming function controls a luminance level of each of the plurality of light sources based on input image data for a corresponding one of the plurality of zones.

6. The method of claim 5, wherein a first filter coefficient of the filter coefficients of the directivity filter for a first pixel located at a midpoint of an edge of the corresponding one of the plurality of zones is determined based on a first parameter calculated from the second luminance level and the third luminance level, and wherein a second filter coefficient of the filter coefficients of the directivity filter for a second pixel located at a corner of the corresponding one of the plurality of zones is determined based on a second parameter calculated from the first luminance level and the third luminance level.

7. The method of claim 5, wherein the luminance level of each of the plurality of light sources is controlled further based on input image data for at least portions of zones adjacent to the corresponding one of the plurality of zones.

8. The method of claim 5, wherein controlling the luminance level of each of the plurality of light sources comprises:

selecting a target part of an input image for each of the plurality of light sources, wherein the target part is displayed in a corresponding region of the display panel, the corresponding region including the corresponding one of the plurality of zones;

applying the directivity filter to the target part of the input image to generate a filtered image part; and determining the luminance level of each of the plurality of light sources based on the filtered image part.

9. The method of claim 8, wherein determining the luminance level of each of the plurality of light sources is based on an average picture level (APL) of the filtered image part.

10. The method of claim 1, wherein the two of the four light sources are arranged in the same row, wherein the method further comprises measuring a fourth luminance level of the measurement area while the display panel is illuminated with second two of the four light sources arranged in the same column, wherein determining the filter coefficients of the directivity filter is further based on the fourth luminance level.

11. A calibration device, comprising:

a luminance measurement device configured to:

measure a first luminance level of a measurement area of a display panel while the display panel is illuminated with four light sources of a backlight device, wherein the four light sources are arranged in two rows and two columns;

measure a second luminance level of the measurement area while the display panel is illuminated with two of the four light sources, the two of the four light sources being arranged in a same row or a same column;

measure a third luminance level of the measurement area while the display panel is illuminated with one of the four light sources; and a processor configured to determine, based on the first, second, and third luminance levels of the measurement area, a set of parameters corresponding to filter coefficients of a directivity filter used for a local dimming function implemented in a display device that includes the display panel, wherein at least certain of the filter coefficients are interpolated from other of the filter coefficients and wherein a subset of the other of the filter coefficients correspond to four times the third luminance level divided by the first luminance level.

12. The calibration device of claim 11, further comprising an interface circuit configured to provide the set of parameters to a display driver configured to control luminance levels of a plurality of light sources of the backlight device with the local dimming function, wherein the plurality of light sources comprises the four light sources.

13. The calibration device of claim 11, wherein the measurement area is defined such that a portion of light emitted from each of the four light sources reaches a portion of the display panel outside the measurement area.

14. The calibration device of claim 11, wherein a plurality of zones corresponding to a plurality of light sources are defined for the display panel, the plurality of light sources comprising the four light sources, wherein the plurality of zones comprises four zones corresponding to the four light sources, wherein the measurement area is defined to encompass the four zones.

15. The calibration device of claim 14, wherein the measurement area has a circular shape and circumscribes the four zones corresponding to the four light sources.

16. The calibration device of claim 14, wherein the local dimming function controls a luminance level of each of the plurality of light sources based on input image data for a corresponding one of the plurality of zones.

17. A non-transitory tangible computer-readable storage medium that stores computer executable instructions which when executed causes a processor to:

acquire a first luminance level of a measurement area of a display panel, wherein the first luminance level of the measurement area is measured while the display panel is illuminated with four light sources of a backlight device, wherein the four light sources are arranged in two rows and two columns;

acquire a second luminance level of the measurement area, wherein the second luminance level of the measurement area is measured while the display panel is illuminated with two of the four light sources, the two of the four light sources being arranged in a same row or a same column;

acquire a third luminance level of the measurement area, wherein the third luminance level of the measurement area is measured while the display panel is illuminated with one of the four light sources; and determine, based on the first, second, and third luminance levels of the measurement area, filter coefficients of a directivity filter used for a local dimming function implemented in a display device that includes the display panel, wherein at least certain of the filter coefficients are interpolated from other of the filter coefficients and wherein a subset of the other of the filter coefficients correspond to four times the third luminance level divided by the first luminance level.

18. The non-transitory tangible computer-readable storage medium of claim 17, wherein the measurement area is defined such that a portion of light emitted from each of the four light sources reaches a portion of the display panel outside the measurement area.

19. The non-transitory tangible computer-readable storage medium of claim 17, wherein a plurality of zones corresponding to a plurality of light sources are defined for the display panel, the plurality of light sources comprising the four light sources, wherein the plurality of zones comprises four zones corresponding to the four light sources, and wherein the measurement area is defined to encompass the four zones.

20. The non-transitory tangible computer-readable storage medium of claim 19, wherein the measurement area has a circular shape and just circumscribes the four zones corresponding to the four light sources.

* * * * *